(12) United States Patent
Imaoka et al.

(10) Patent No.: US 9,250,423 B2
(45) Date of Patent: Feb. 2, 2016

(54) ZOOM LENS SYSTEM, INTERCHANGEABLE LENS APPARATUS AND CAMERA SYSTEM

(71) Applicant: PANASONIC CORPORATION, Osaka (JP)

(72) Inventors: Takuya Imaoka, Kanagawa (JP); Tsuneo Uchida, Chiba (JP); Shunichiro Yoshinaga, Osaka (JP); Masafumi Sueyoshi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/916,931

(22) Filed: Jun. 13, 2013

(65) Prior Publication Data
US 2013/0335617 A1 Dec. 19, 2013

(30) Foreign Application Priority Data

Jun. 15, 2012 (JP) .................................. 2012-135512
Apr. 19, 2013 (JP) .................................. 2013-088142

(51) Int. Cl.
*G02B 15/14* (2006.01)
*G02B 27/64* (2006.01)
*G02B 15/173* (2006.01)

(52) U.S. Cl.
CPC .............. *G02B 15/14* (2013.01); *G02B 15/173* (2013.01); *G02B 27/646* (2013.01)

(58) Field of Classification Search
CPC ............ G02B 7/00; G02B 7/02; G02B 15/00; G02B 15/14; G02B 15/16; G02B 15/20; G02B 15/22

USPC .......................................... 359/676–688, 557
See application file for complete search history.

(56) References Cited

U.S. PATENT DOCUMENTS

| | | | | |
|---|---|---|---|---|
| 6,483,648 B1 * | 11/2002 | Yamanashi | | 359/683 |
| 7,177,092 B2 * | 2/2007 | Satori et al. | | 359/683 |
| 7,268,811 B2 * | 9/2007 | Shirasuna | | 348/240.3 |
| 7,515,353 B2 * | 4/2009 | Kimura | | 359/689 |
| 7,864,442 B2 * | 1/2011 | Yamashita | | 359/683 |
| 2009/0103187 A1 * | 4/2009 | Watanebe et al. | | 359/687 |
| 2009/0174952 A1 | 7/2009 | Satori | | |
| 2010/0091171 A1 * | 4/2010 | Miyazaki et al. | | 348/345 |
| 2010/0220398 A1 * | 9/2010 | Ohtake | | 359/683 |
| 2011/0019033 A1 * | 1/2011 | Ori et al. | | 348/240.3 |
| 2011/0102639 A1 * | 5/2011 | Mihara et al. | | 348/240.3 |

(Continued)

FOREIGN PATENT DOCUMENTS

JP 2007-047538 A 2/2007
JP 2009-163066 A 7/2009

(Continued)

*Primary Examiner* — Thong Nguyen
(74) *Attorney, Agent, or Firm* — McDermott Will & Emery LLP

(57) ABSTRACT

A zoom lens system, in order from an object side to an image side, includes a first lens unit having positive optical power; a second lens unit having negative optical power; a third lens unit having positive optical power; a fourth lens unit having negative optical power, and a subsequent lens unit. The first lens unit includes a negative lens element and a positive lens element. In the zoom lens system, the conditions: $1.47<nd_2<1.57$ and $60<vd_2<75$ ($nd_2$: a refractive index to a d-line of the positive lens element, $vd_2$: an Abbe number to a d-line of the positive lens element) are satisfied.

16 Claims, 33 Drawing Sheets

(56) References Cited

U.S. PATENT DOCUMENTS

| | | |
|---|---|---|
| 2011/0149412 A1* | 6/2011 | Sato .............................. 359/683 |
| 2011/0267708 A1* | 11/2011 | Kon .............................. 359/773 |
| 2011/0273780 A1* | 11/2011 | Hosoi et al. ................... 359/690 |
| 2012/0087017 A1* | 4/2012 | Fujisaki ........................ 359/687 |
| 2013/0169846 A1* | 7/2013 | Yanai et al. ................ 348/240.1 |
| 2014/0139720 A1* | 5/2014 | Ogata et al. ................... 348/345 |

FOREIGN PATENT DOCUMENTS

| | | |
|---|---|---|
| JP | 2011-197471 A | 10/2011 |
| JP | 2011-232624 A | 11/2011 |

* cited by examiner

ZOOM LENS SYSTEM, INTERCHANGEABLE LENS APPARATUS AND CAMERA SYSTEM

CROSS-REFERENCE TO RELATED APPLICATION

This application is based on application No. 2012-135512 filed in Japan on Jun. 15, 2012 and application No. 2013-088142 filed in Japan on Apr. 19, 2013, the contents of which are hereby incorporated by reference.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Zoom lens systems having excellent optical performance from a wide-angle limit to a telephoto limit have been desired as zoom lens systems to be used in interchangeable lens apparatuses. For example, various kinds of zoom lens systems have been proposed, each having a multiple-unit construction in which a positive lens unit is located closest to an object side.

Japanese Laid-Open Patent Publication No. 2011-232624 discloses an optical imaging system having a four-unit construction of positive, negative, positive, and negative, in which zooming is performed by moving the respective lens units from a wide-angle limit to a telephoto limit, and the first lens unit is composed of two lenses, a positive lens and a negative lens.

Japanese Laid-Open Patent Publication No. 2011-197471 discloses a zoom lens system having a six-unit construction of positive, negative, positive, negative, negative, and positive, in which zooming is performed by moving the second lens unit, the fourth lens unit, and the fifth lens unit from a wide-angle limit to a telephoto limit, and focusing is performed by moving the three lens units that are moved in zooming.

Japanese Patent No. 4802598 discloses an optical imaging system having a five-unit construction of positive, negative, positive, negative, and positive, in which zooming is performed by moving the respective lens units from a wide-angle limit to a telephoto limit, and the first lens unit is composed of two lenses, a positive lens and a negative lens.

SUMMARY

The present disclosure provides a compact zoom lens system having excellent optical performance, in which chromatic aberration is sufficiently compensated. Further, the present disclosure provides an interchangeable lens apparatus and a camera system, each employing the zoom lens system.

The novel concepts disclosed herein were achieved in order to solve the foregoing problems in the related art, and herein is disclosed:

a zoom lens system having a plurality of lens units, each lens unit comprising at least one lens element, the zoom lens system, in order from an object side to an image side, comprising: a first lens unit having positive optical power; a second lens unit having negative optical power; a third lens unit having positive optical power; a fourth lens unit having negative optical power, and a subsequent lens unit, wherein the first lens unit comprises a negative lens element, and a positive lens element, and wherein the following conditions (1) and (2) are satisfied:

$$1.47 < nd_2 < 1.57 \tag{1}$$

$$60 < vd_2 < 75 \tag{2}$$

where $nd_2$ is a refractive index to a d-line of the positive lens element, and $vd_2$ is an Abbe number to a d-line of the positive lens element.

The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, wherein the zoom lens system has a plurality of lens units, each lens unit comprising at least one lens element, the zoom lens system, in order from an object side to an image side, comprises: a first lens unit having positive optical power; a second lens unit having negative optical power; a third lens unit having positive optical power; a fourth lens unit having negative optical power, and a subsequent lens unit, wherein the first lens unit comprises a negative lens element, and a positive lens element, and wherein the following conditions (1) and (2) are satisfied:

$$1.47 < nd_2 < 1.57 \tag{1}$$

$$60 < vd_2 < 75 \tag{2}$$

where $nd_2$ is a refractive index to a d-line of the positive lens element, and $vd_2$ is an Abbe number to a d-line of the positive lens element.

The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system has a plurality of lens units, each lens unit comprising at least one lens element, the zoom lens system, in order from an object side to an image side, comprises: a first lens unit having positive optical power; a second lens unit having negative optical power; a third lens unit having positive optical power; a fourth lens unit having negative optical power, and a subsequent lens unit, wherein the first lens unit comprises a negative lens element, and a positive lens element, and wherein
the following conditions (1) and (2) are satisfied:

$$1.47 < nd_2 < 1.57 \quad (1)$$

$$60 < vd_2 < 75 \quad (2)$$

where
$nd_2$ is a refractive index to a d-line of the positive lens element, and
$vd_2$ is an Abbe number to a d-line of the positive lens element.

The zoom lens system according to the present disclosure enables chromatic aberration to be sufficiently compensated, has high optical performance, and is compact.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
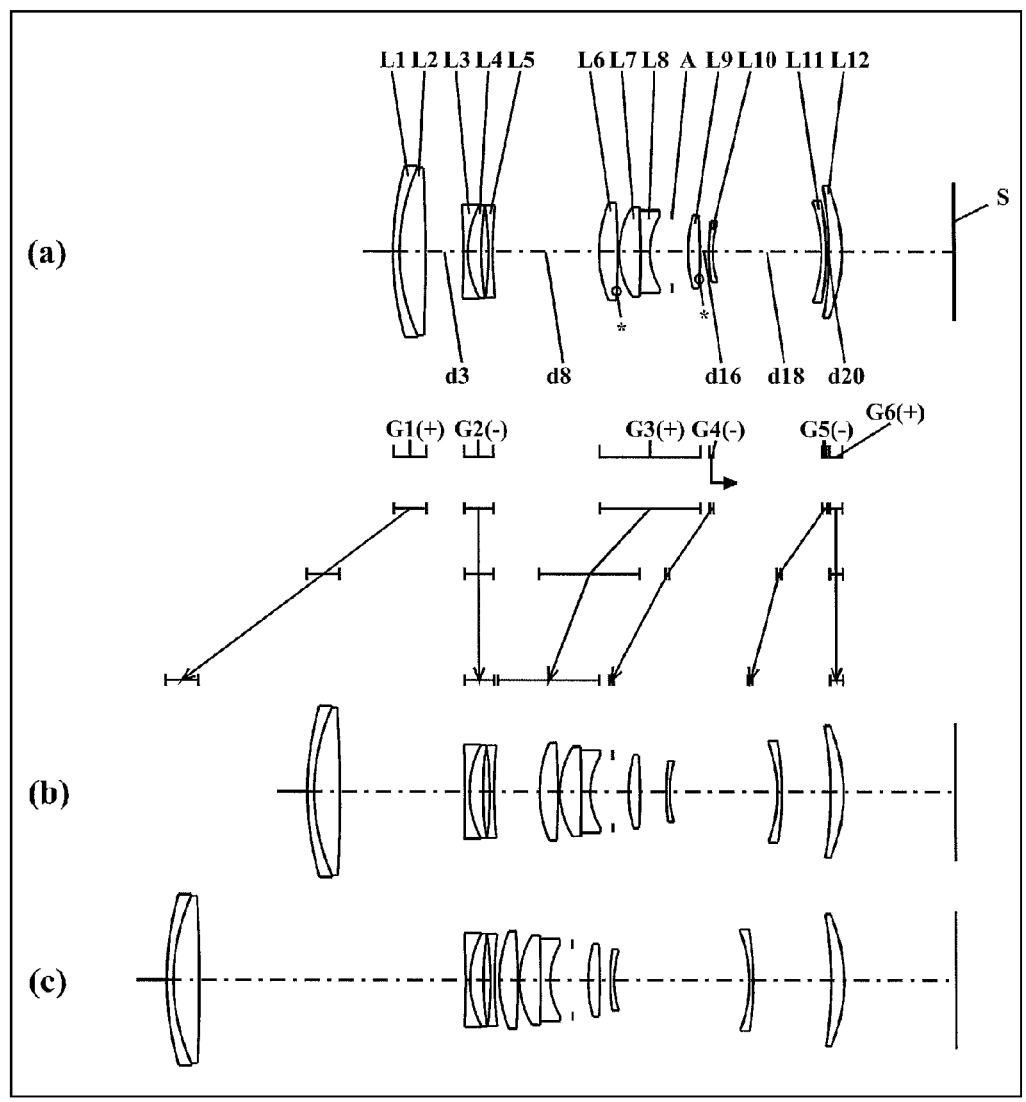
FIG. 1 is a lens arrangement diagram showing an infinity in-focus condition of a zoom lens system according to Embodiment 1 (Numerical Example 1)
Figure 2:
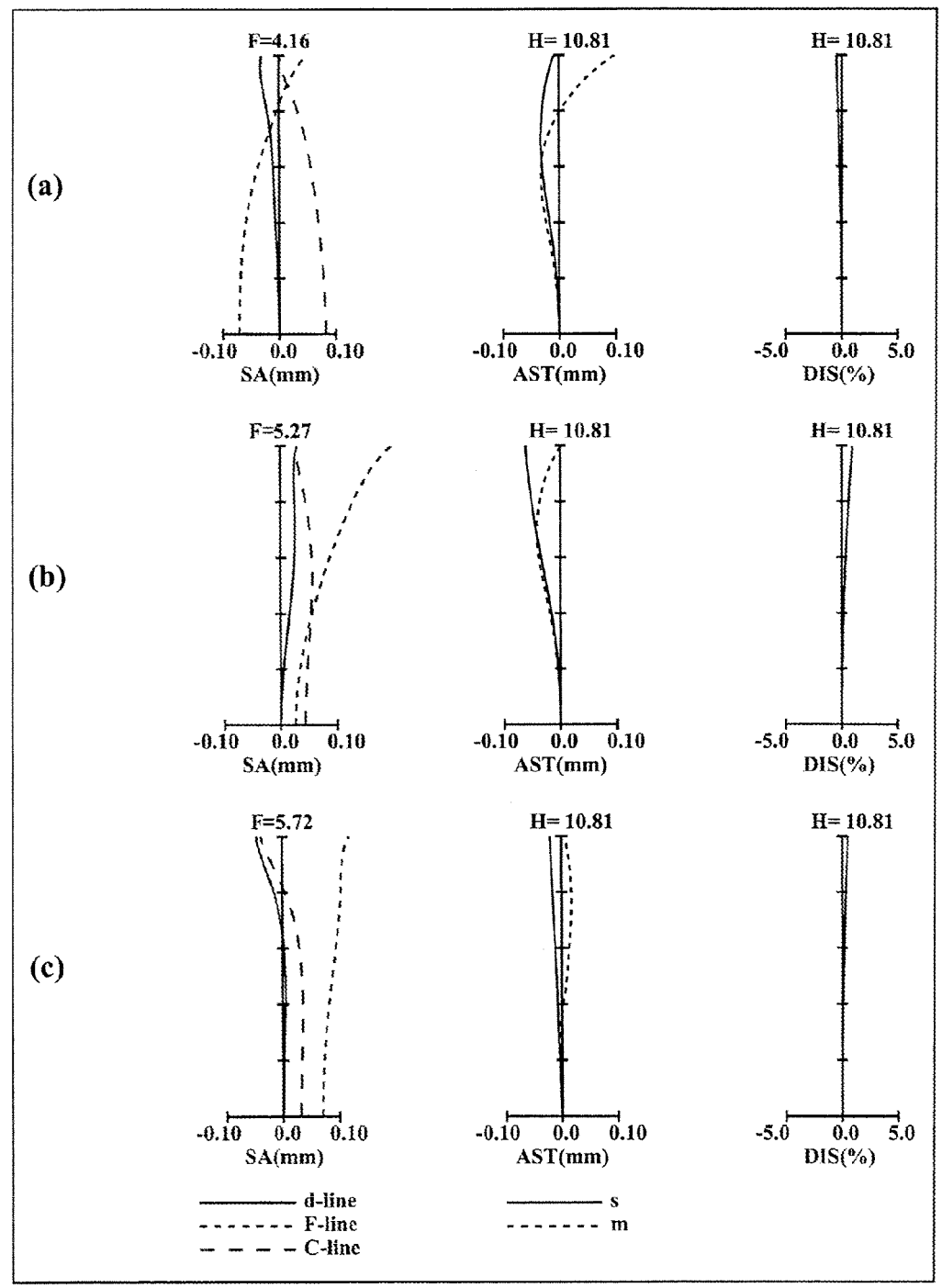
FIG. 2 is a longitudinal aberration diagram of an infinity in-focus condition of the zoom lens system according to Numerical Example 1.
Figure 3:
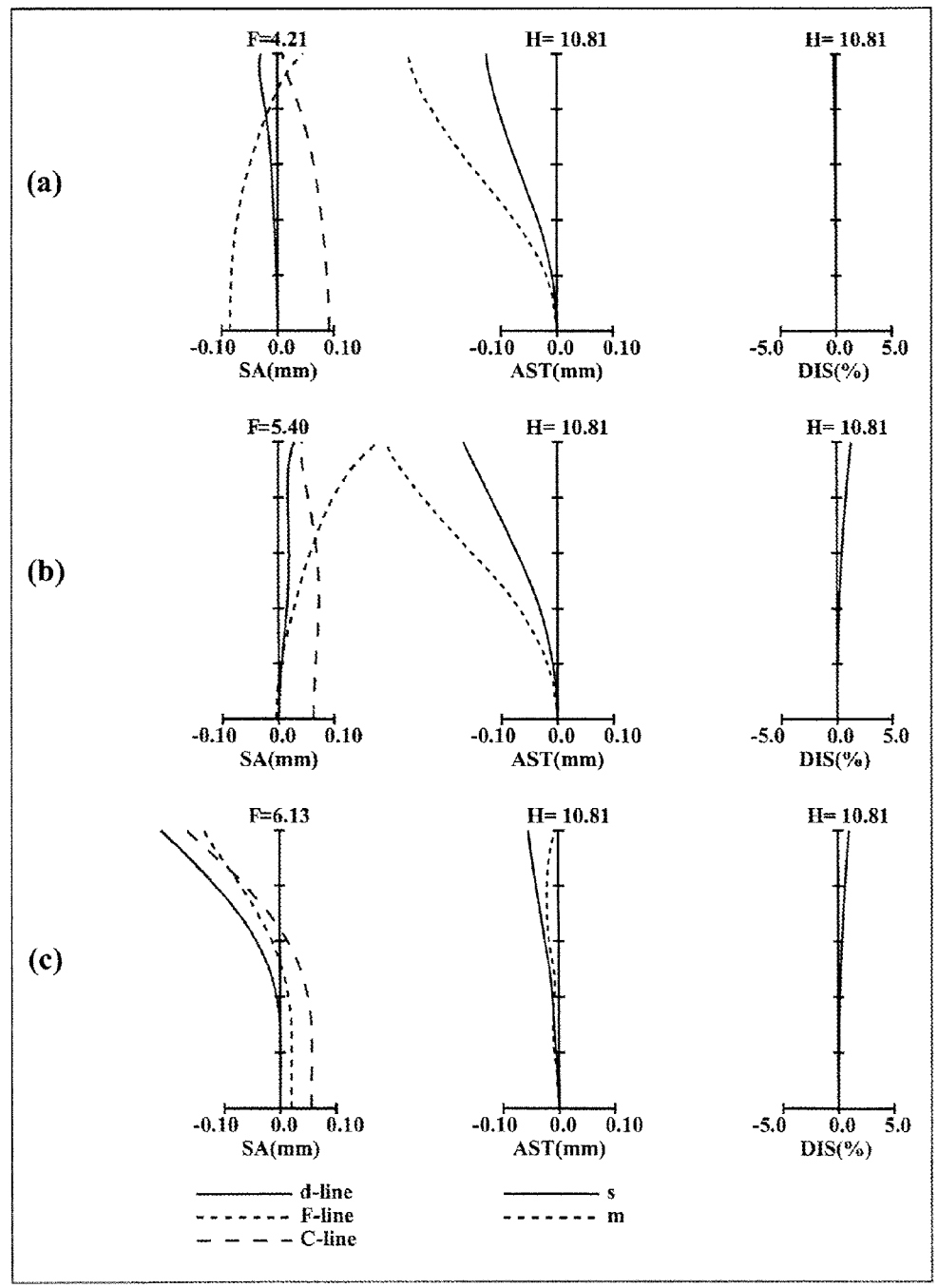
FIG. 3 is a longitudinal aberration diagram of a close-object in-focus condition of the zoom lens system according to Numerical Example 1.
Figure 4:
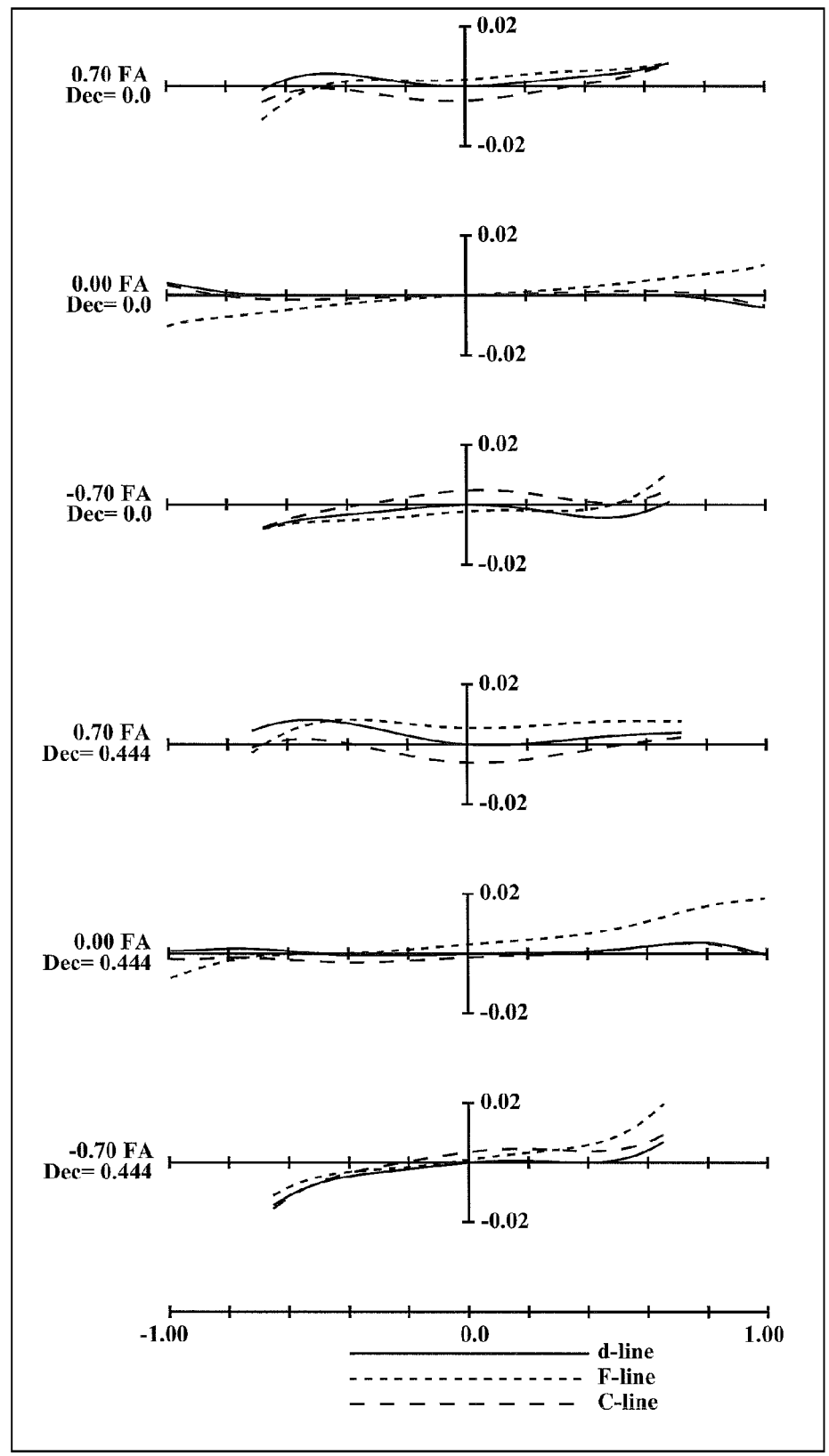
FIG. 4 is a lateral aberration diagram of the zoom lens system according to Numerical Example 1 at a telephoto limit in a basic state where image blur compensation is not performed and in an image blur compensation state.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 8

FIGS. 1, 5, 9, 13, 17, 21, 25, and 29 are lens arrangement diagrams of zoom lens systems according to Embodiments 1 to 8, respectively, and each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). In each Fig., each bent arrow provided between part (a) and part (b) indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and therefore this line does not indicate actual motion of each lens unit.

Furthermore, in each Fig., an arrow imparted to each lens unit indicates focusing from an infinity in-focus condition to a close-object in-focus condition. That is, in FIGS. 1, 5, 9, 13, 17, 21, 25, and 29, the arrow indicates a direction in which a fourth lens unit G4 described later moves in focusing from an infinity in-focus condition to a close-object in-focus condition. In FIGS. 1, 5, 9, 13, 17, 21, 25, and 29, since a reference numeral of each unit is shown in part (a), the arrow indicating focusing is given beneath the reference numeral of each lens unit. However, in each zooming state, the direction in which each lens unit moves in focusing will be described later in detail for each embodiment.

Each of the zoom lens systems according to Embodiments 1 and 3 to 7, in order from the object side to the image side, comprises: a first lens unit G1 having positive optical power; a second lens unit G2 having negative optical power; a third lens unit G3 having positive optical power; a fourth lens unit G4 having negative optical power; a fifth lens unit G5 having negative optical power; and a sixth lens unit G6 having positive optical power. In the zoom lens system according to each embodiment, in zooming, the first lens unit G1, the third lens unit G3, the fourth lens unit G4, and the fifth lens unit G5 individually move along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6 vary. In the zoom lens system according to each embodiment, these lens units are arranged in a desired optical power allocation, whereby size reduction of the entire lens system is achieved while maintaining high optical performance.

Each of the zoom lens systems according to Embodiments 2 and 8, in order from the object side to the image side, comprises: a first lens unit G1 having positive optical power; a second lens unit G2 having negative optical power; a third lens unit G3 having positive optical power; a fourth lens unit G4 having negative optical power; and a fifth lens unit G5 having positive optical power. In the zoom lens system according to each embodiment, in zooming, the first lens unit G1, the third lens unit G3, and the fourth lens unit G4 individually move along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5 vary. In the zoom lens system according to each embodiment, these lens units are arranged in a desired optical power allocation, whereby size reduction of the entire lens system is achieved while maintaining high optical performance.

In FIGS. 1, 5, 9, 13, 17, 21, 25, and 29, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Further, as shown in FIGS. 1, 5, 9, 13, 17, 21, 25, and 29, an aperture diaphragm A is provided in the third lens unit G3, that is, between an eighth lens element L8 and a ninth lens element L9.

Embodiment 1

As shown in FIG. 1, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5 comprises solely a negative meniscus eleventh lens element L11 with the convex surface facing the image side.

The sixth lens unit G6 comprises solely a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3, the fourth lens unit G4, and the fifth lens unit G5 move with locus of a slight convex to the object side, and the second lens unit G2 and the sixth lens unit G6 are fixed with respect to the image surface S. That is, in zooming, the first lens unit G1, the third lens unit G3, the fourth lens unit G4, and the fifth lens unit G5 individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 2

Figure 5:
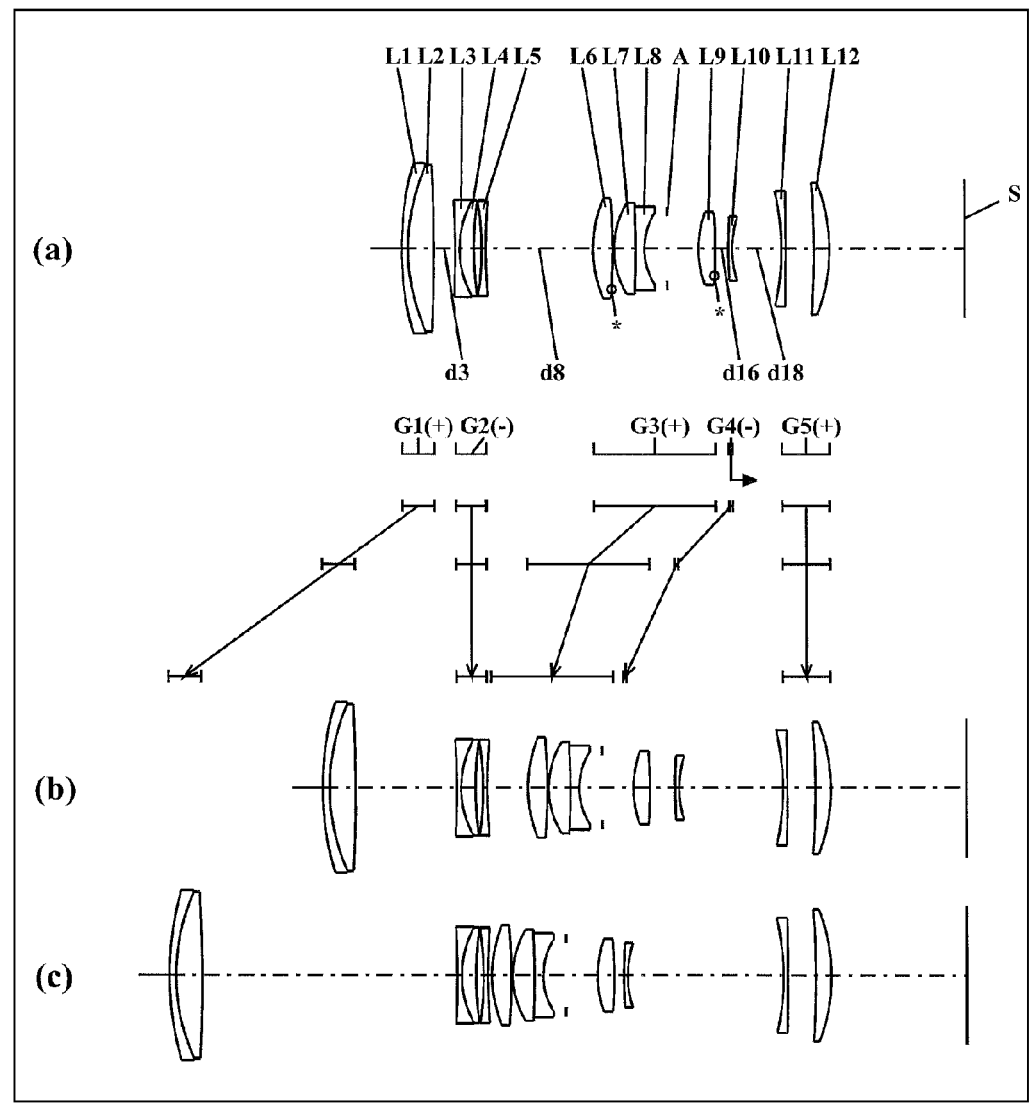
FIG. 5 is a lens arrangement diagram showing an infinity in-focus condition of a zoom lens system according to Embodiment 2 (Numerical Example 2)
Figure 6:
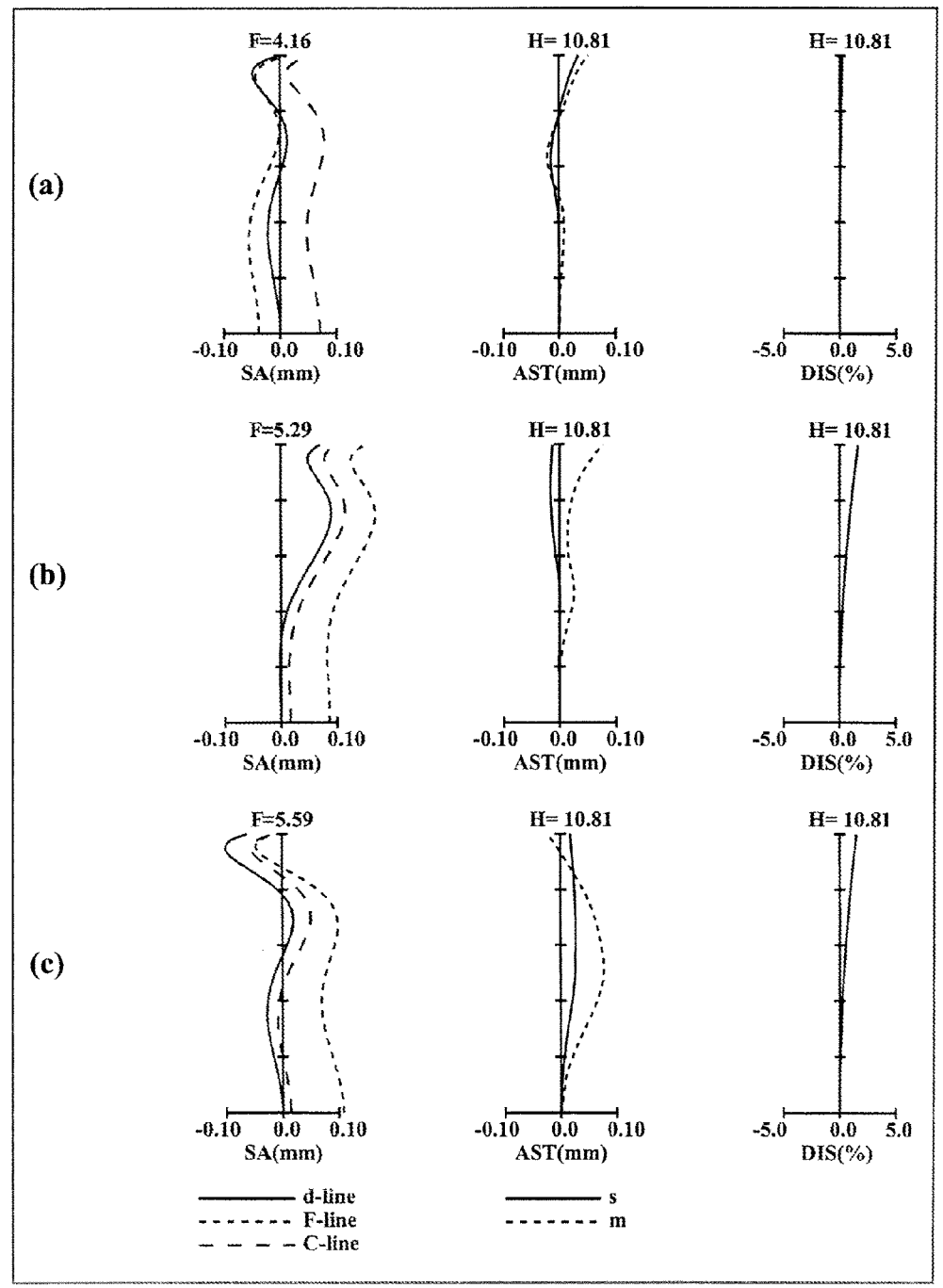
FIG. 6 is a longitudinal aberration diagram of an infinity in-focus condition of the zoom lens system according to Numerical Example 2.
Figure 7:
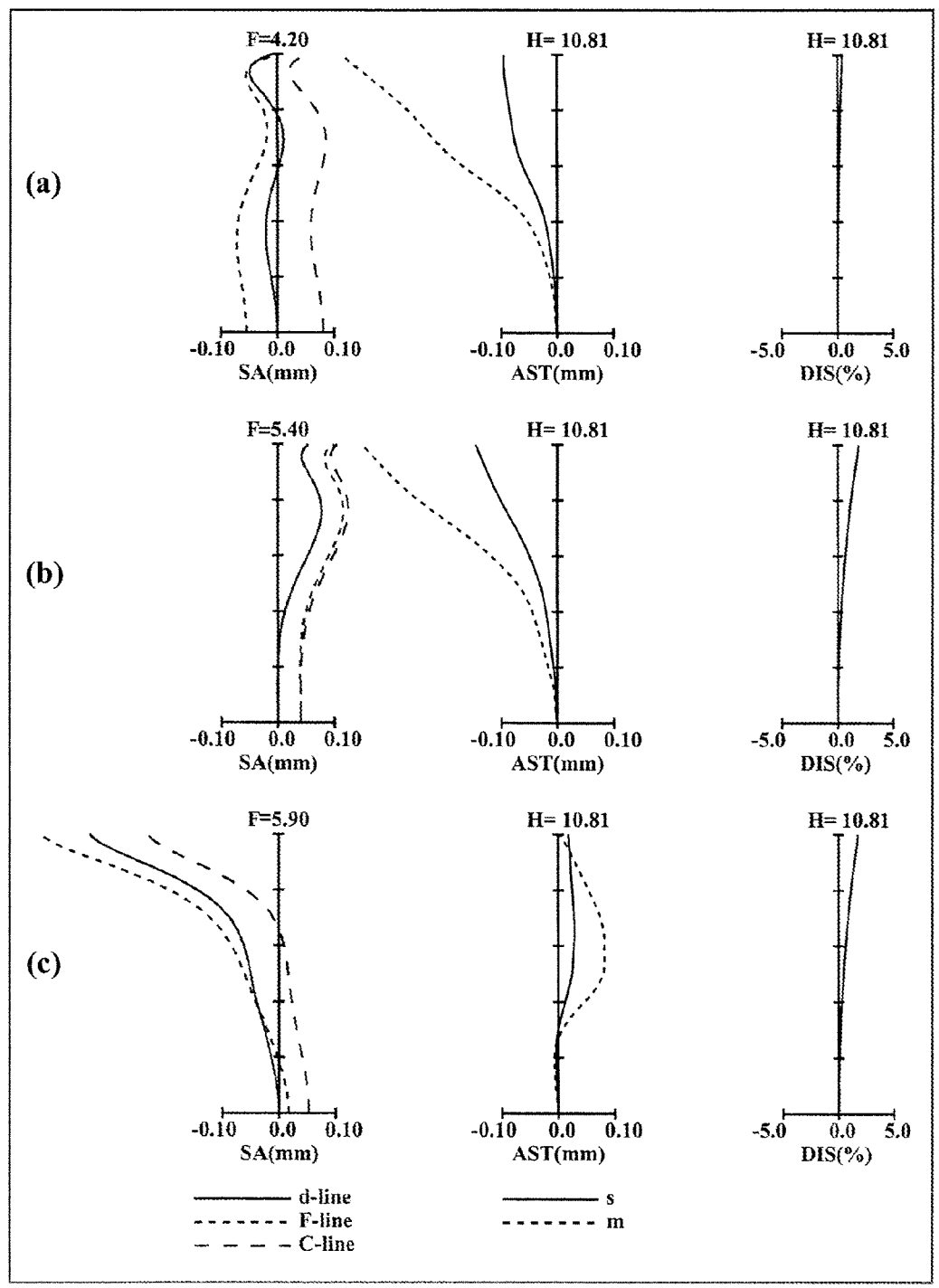
FIG. 7 is a longitudinal aberration diagram of a close-object in-focus condition of the zoom lens system according to Numerical Example 2.
Figure 8:
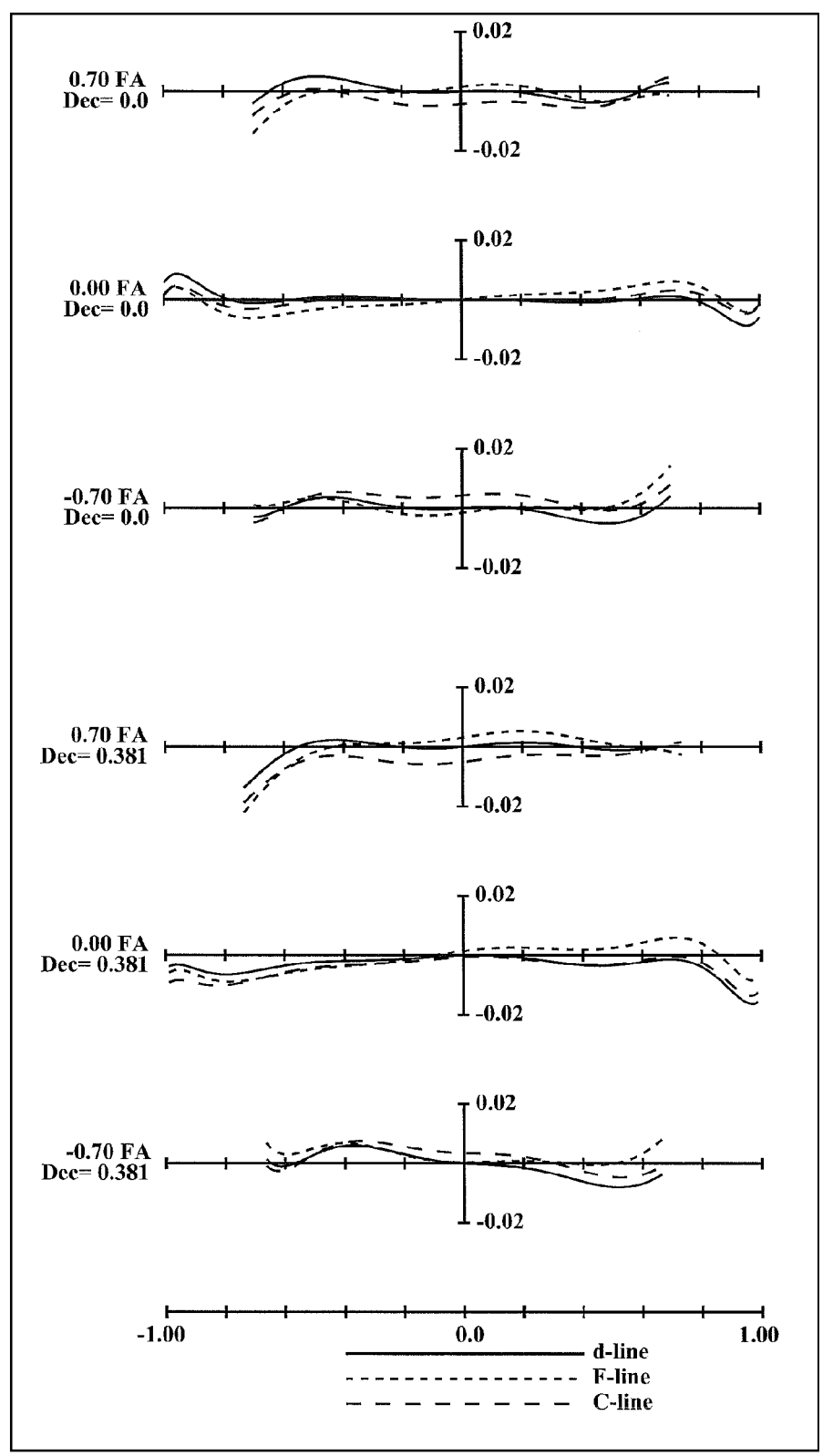
FIG. 8 is a lateral aberration diagram of the zoom lens system according to Numerical Example 2 at a telephoto limit in a basic state where image blur compensation is not performed and in an image blur compensation state.

As shown in FIG. 5, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5, in order from the object side to the image side, comprises: a negative meniscus eleventh lens element L11 with the convex surface facing the image side; and a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3 and the fourth lens unit G4 move with locus of a slight convex to the object side, and the second lens unit G2 and the fifth lens unit G5 are fixed with respect to the image surface S. That is, in zooming, the first lens unit G1, the third lens unit G3, and the fourth lens unit G4 individually move along the optical axis such that the interval between the first lens unit G1 and the second lens unit G2 and the interval between the fourth lens unit G4 and the fifth lens unit G5 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 3

Figure 9:
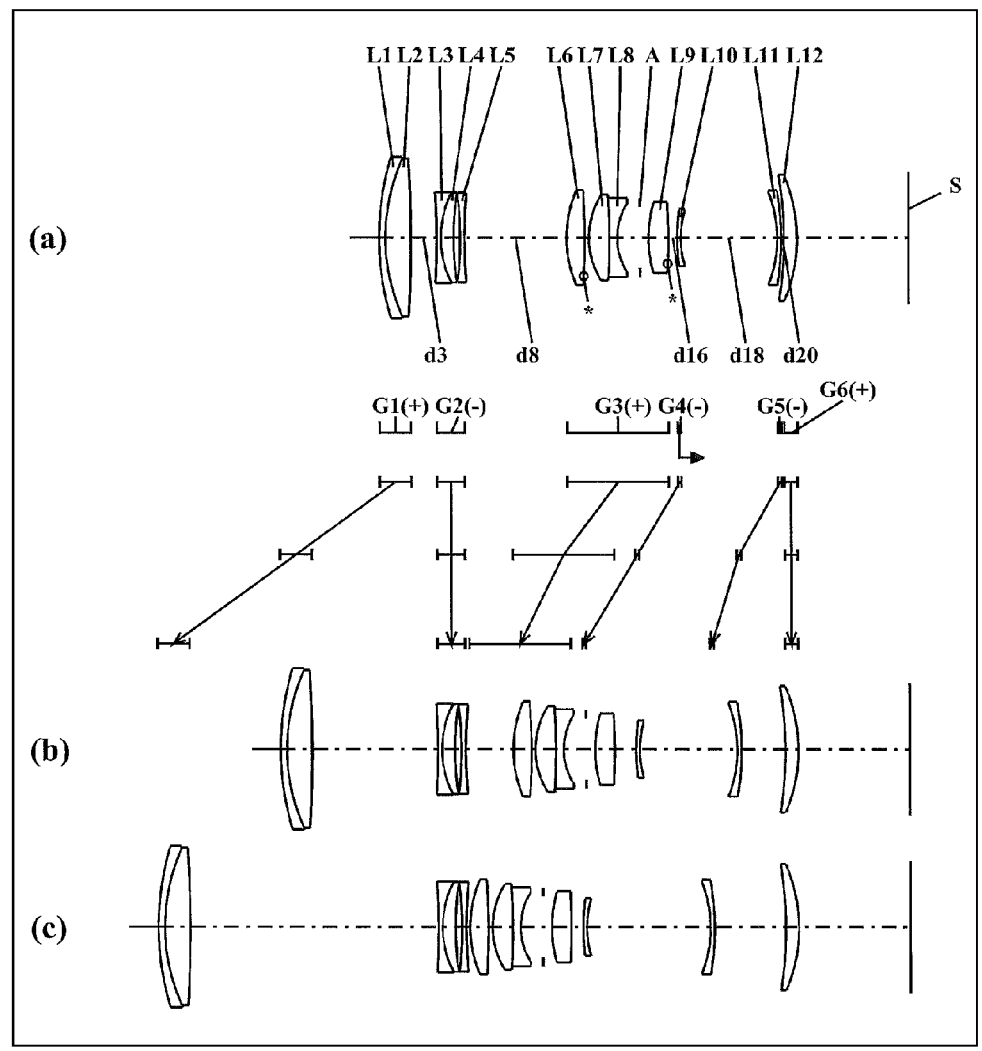
FIG. 9 is a lens arrangement diagram showing an infinity in-focus condition of a zoom lens system according to Embodiment 3 (Numerical Example 3)
Figure 10:
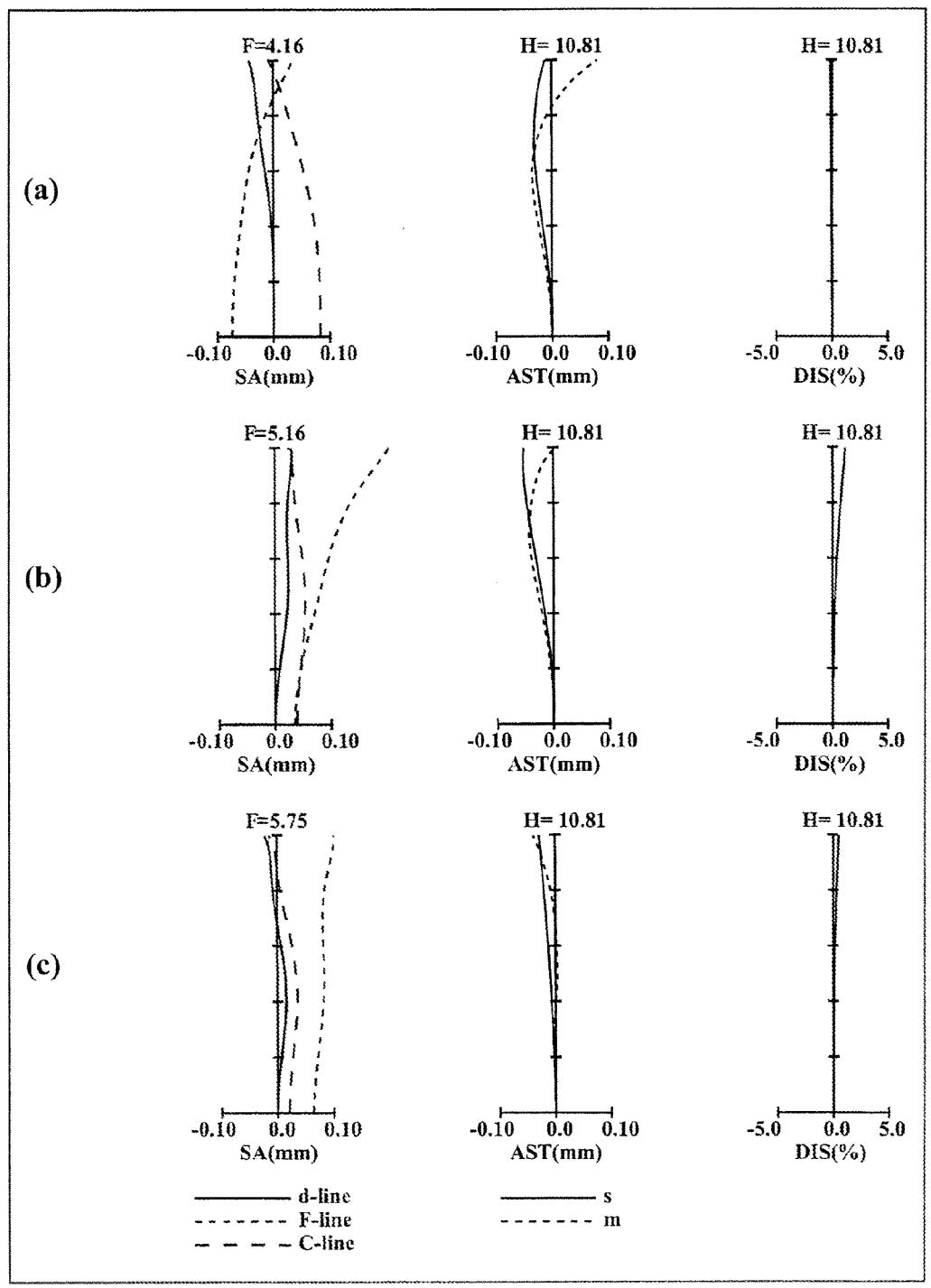
FIG. 10 is a longitudinal aberration diagram of an infinity in-focus condition of the zoom lens system according to Numerical Example 3.
Figure 11:
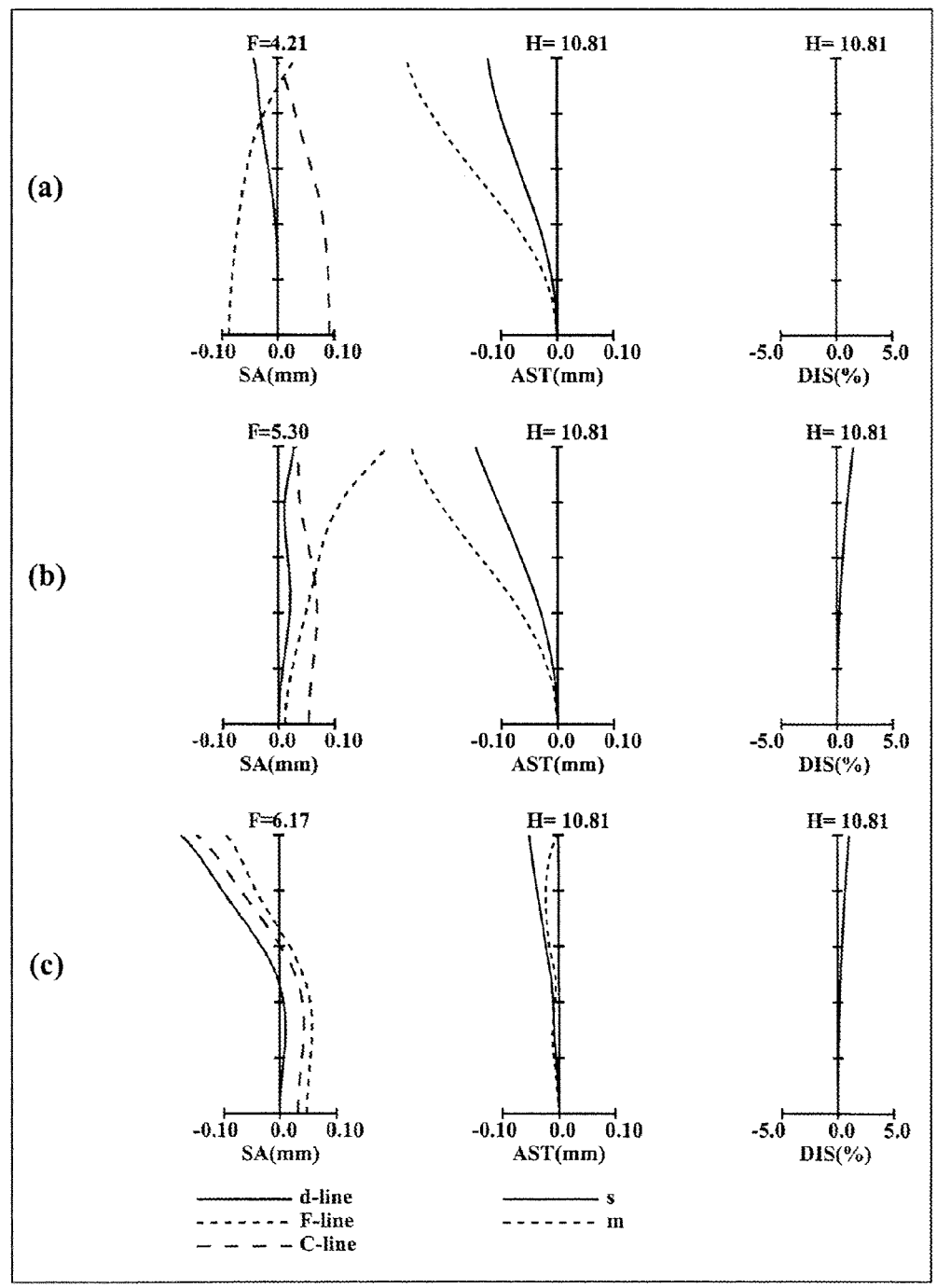
FIG. 11 is a longitudinal aberration diagram of a close-object in-focus condition of the zoom lens system according to Numerical Example 3.
Figure 12:
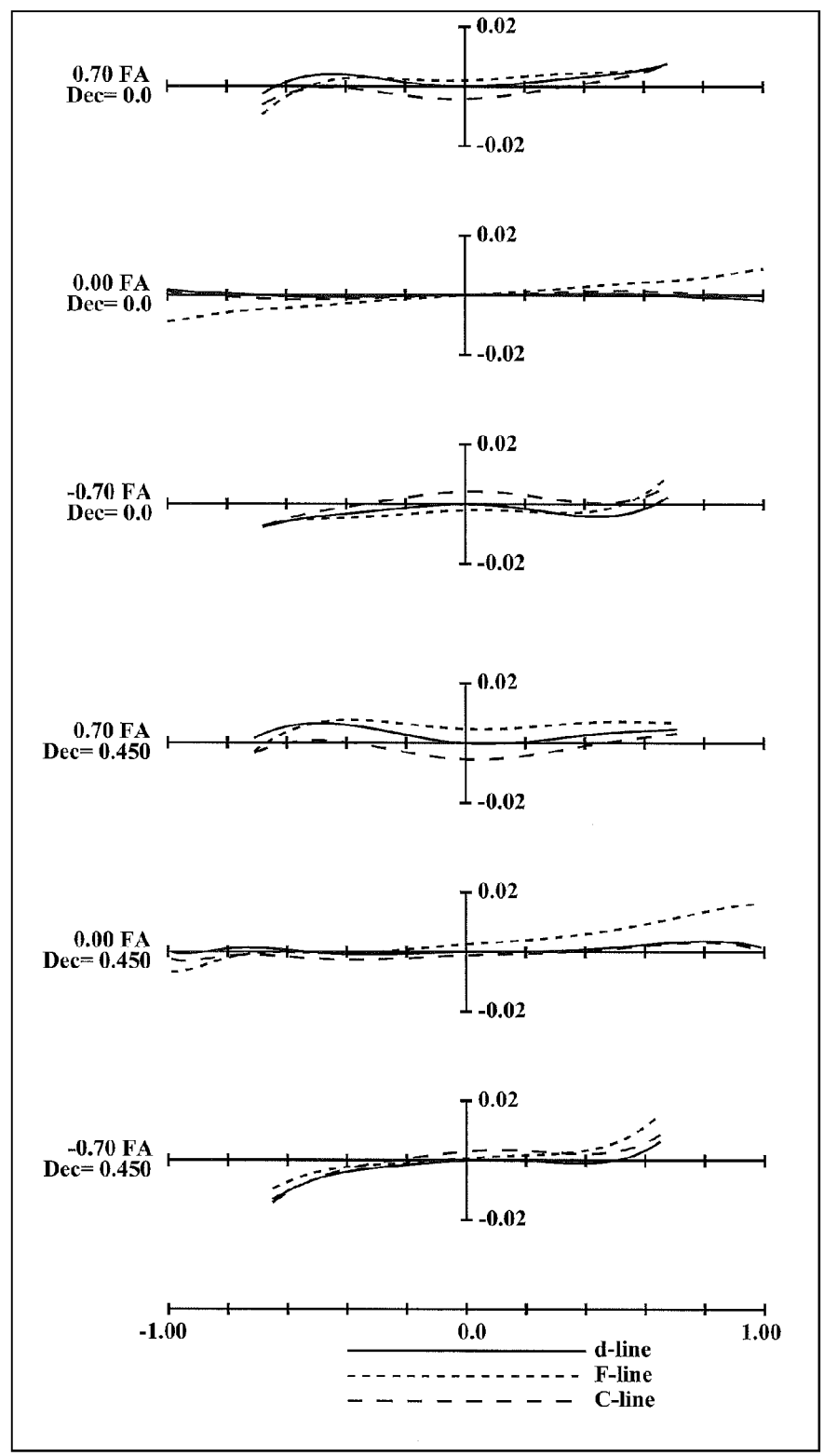
FIG. 12 is a lateral aberration diagram of the zoom lens system according to Numerical Example 3 at a telephoto limit in a basic state where image blur compensation is not performed and in an image blur compensation state.

As shown in FIG. 9, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5 comprises solely a negative meniscus eleventh lens element L11 with the convex surface facing the image side.

The sixth lens unit G6 comprises solely a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3, the fourth lens unit G4, and the fifth lens unit G5 move with locus of a slight convex to the object side, and the second lens unit G2 and the sixth lens unit G6 are fixed with respect to the image surface S. That is, in zooming, the first lens unit G1, the third lens unit G3, the fourth lens unit G4, and the fifth lens unit G5 individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 4

Figure 13:
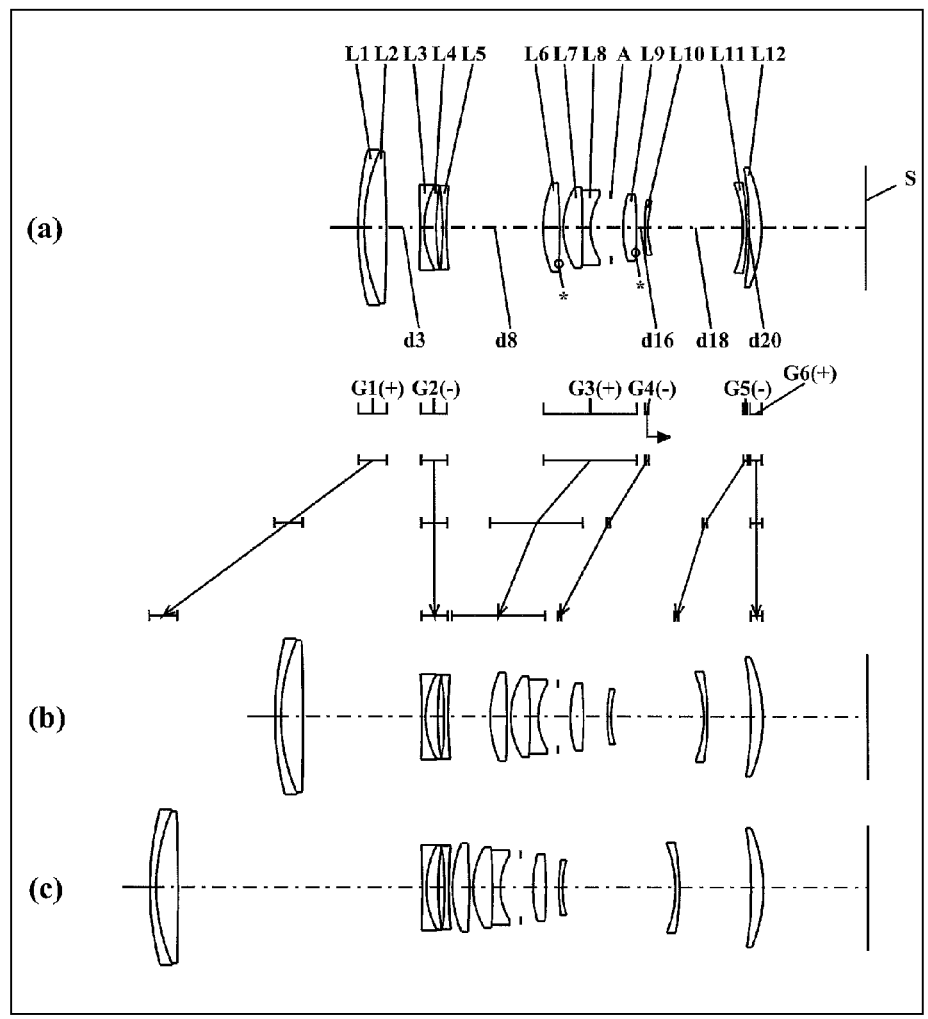
FIG. 13 is a lens arrangement diagram showing an infinity in-focus condition of a zoom lens system according to Embodiment 4 (Numerical Example 4)
Figure 14:
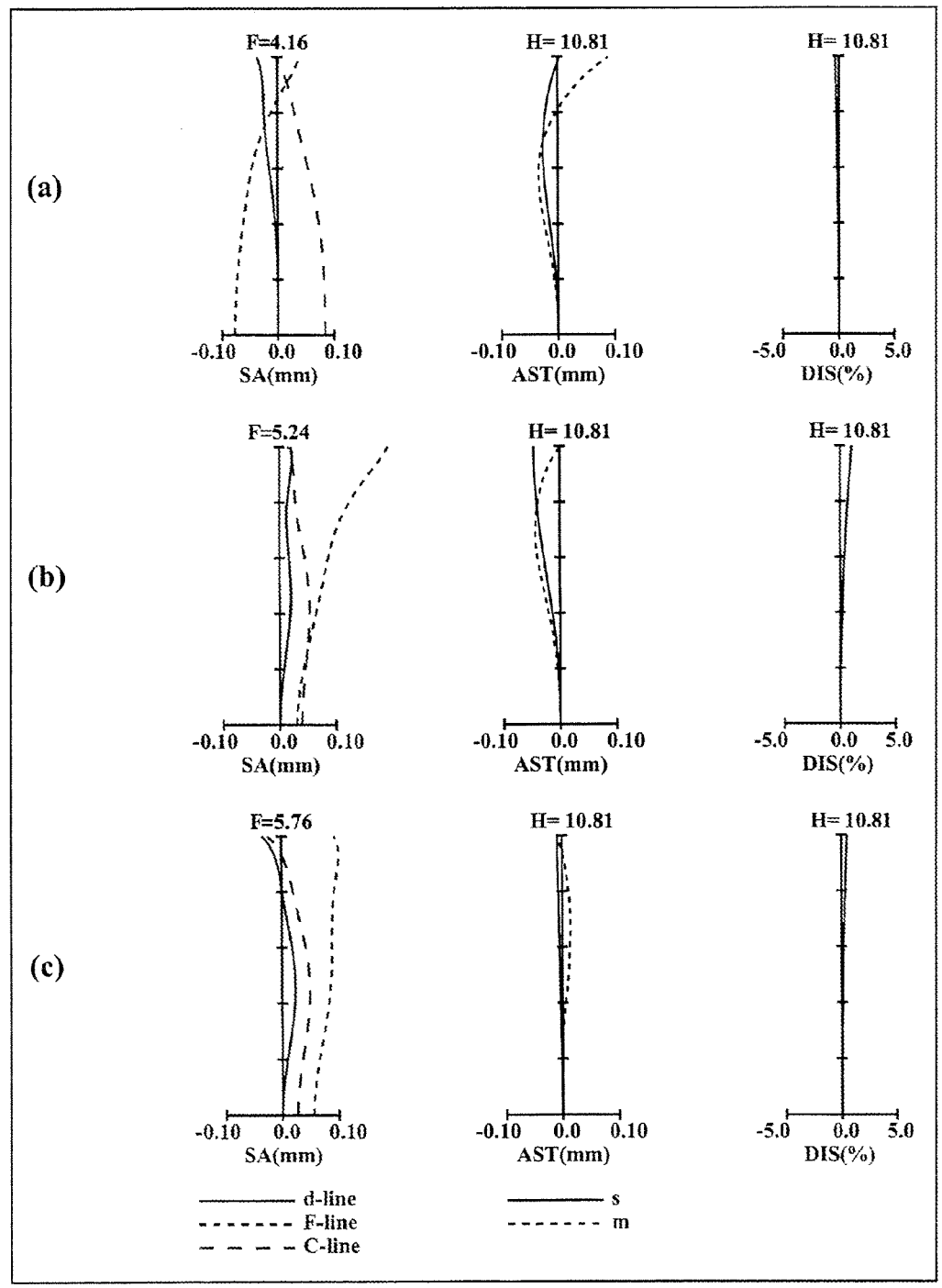
FIG. 14 is a longitudinal aberration diagram of an infinity in-focus condition of the zoom lens system according to Numerical Example 4.
Figure 15:
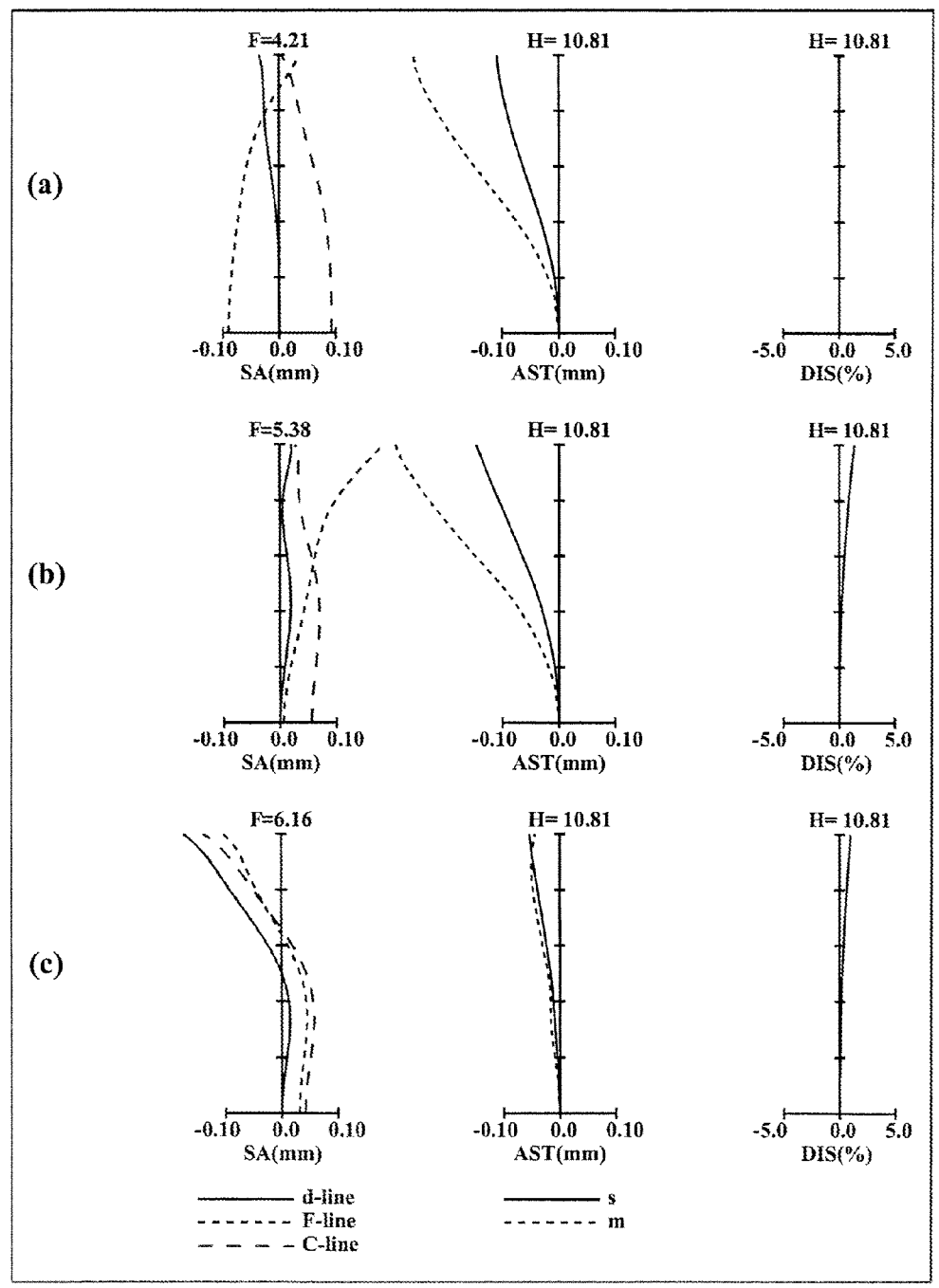
FIG. 15 is a longitudinal aberration diagram of a close-object in-focus condition of the zoom lens system according to Numerical Example 4.
Figure 16:
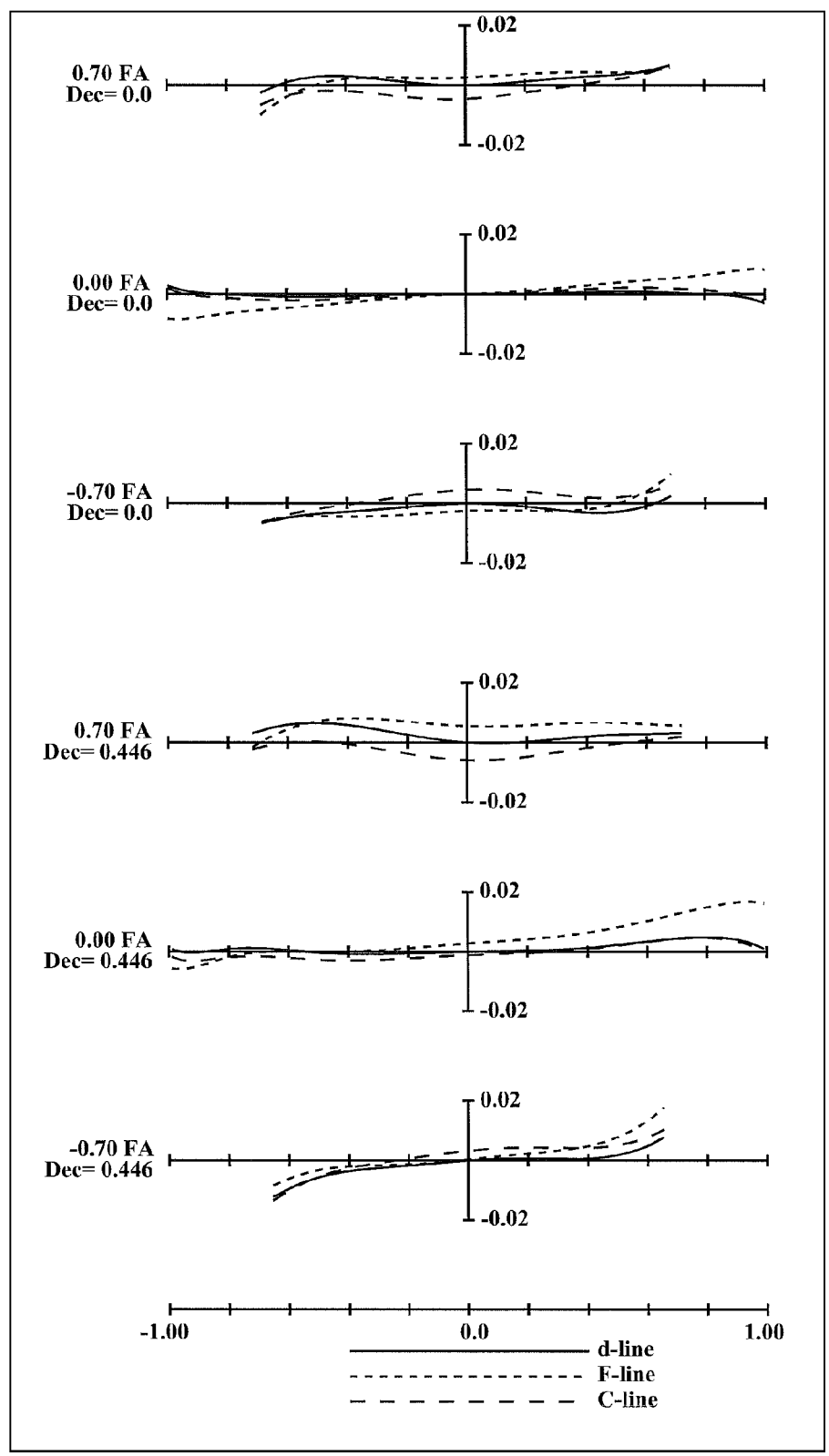
FIG. 16 is a lateral aberration diagram of the zoom lens system according to Numerical Example 4 at a telephoto limit in a basic state where image blur compensation is not performed and in an image blur compensation state.

As shown in FIG. 13, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5 comprises solely a negative meniscus eleventh lens element L11 with the convex surface facing the image side.

The sixth lens unit G6 comprises solely a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3, the fourth lens unit G4, and the fifth lens unit G5 move with locus of a slight convex to the object side, and the second lens unit G2 and the sixth lens unit G6 are fixed with respect to the image surface S. That is, in zooming, the first lens unit G1, the third lens unit G3, the fourth lens unit G4, and the fifth lens unit G5 individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 5

Figure 17:
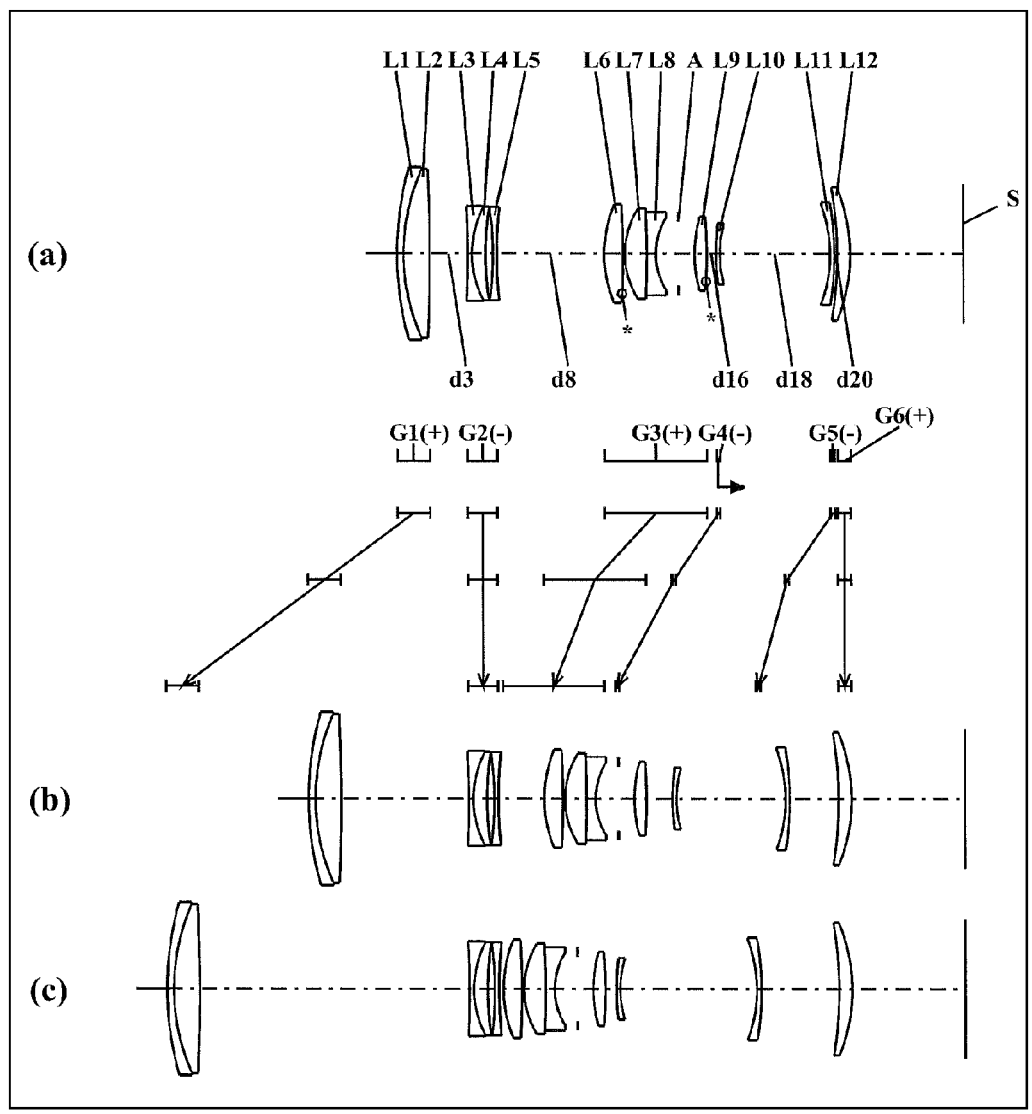
FIG. 17 is a lens arrangement diagram showing an infinity in-focus condition of a zoom lens system according to Embodiment 5 (Numerical Example 5)
Figure 18:
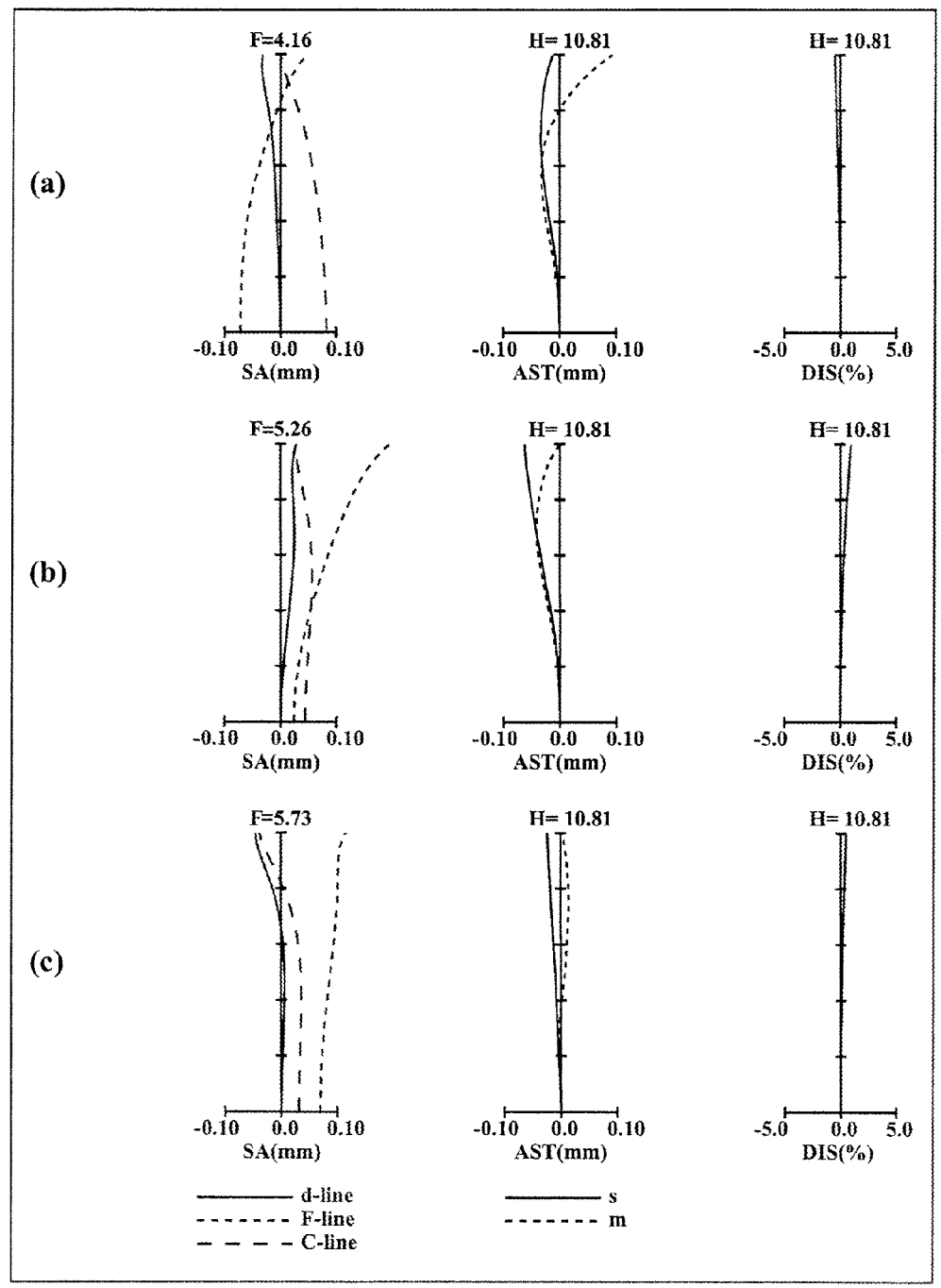
FIG. 18 is a longitudinal aberration diagram of an infinity in-focus condition of the zoom lens system according to Numerical Example 5.
Figure 19:
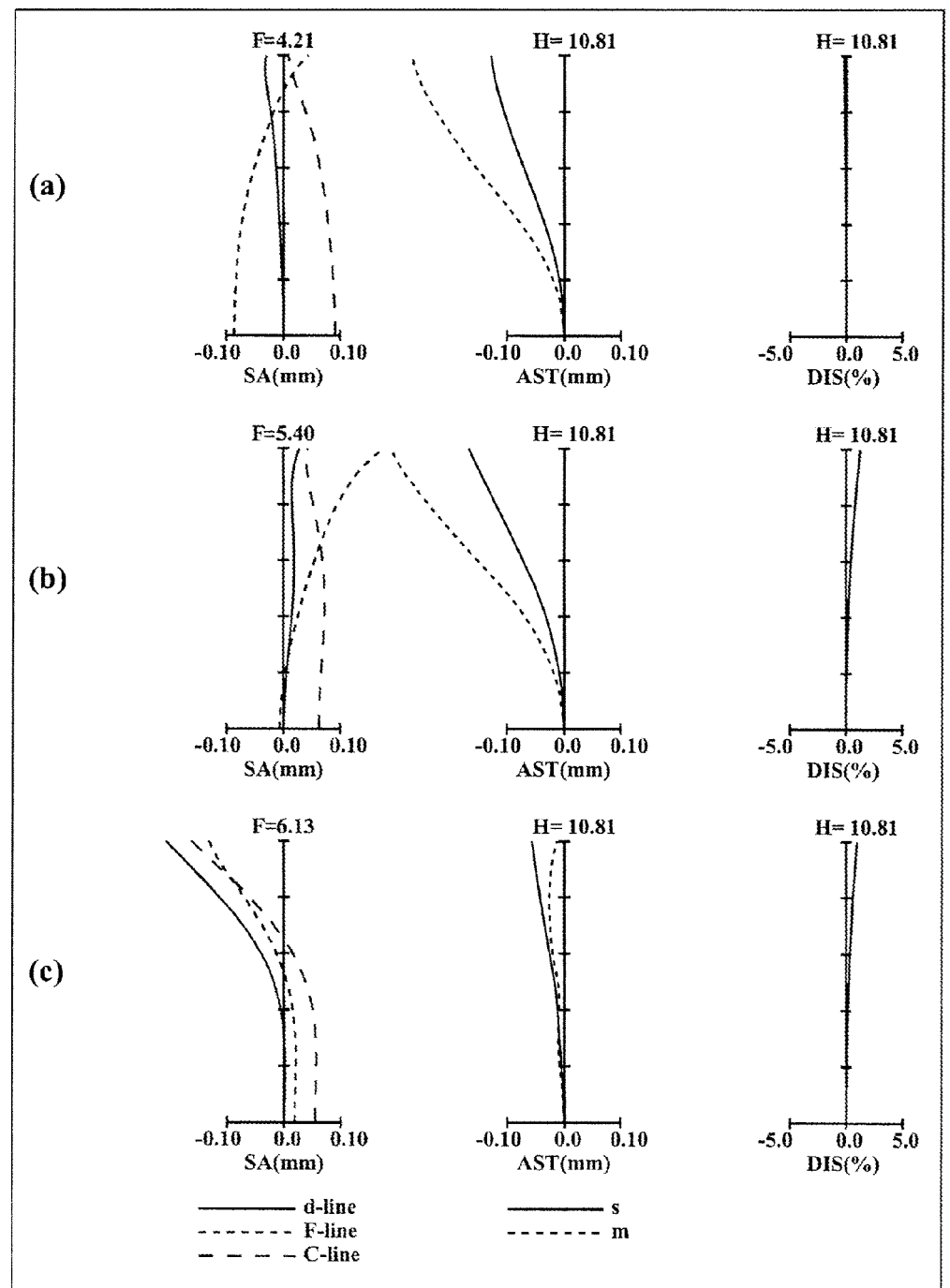
FIG. 19 is a longitudinal aberration diagram of a close-object in-focus condition of the zoom lens system according to Numerical Example 5.
Figure 20:
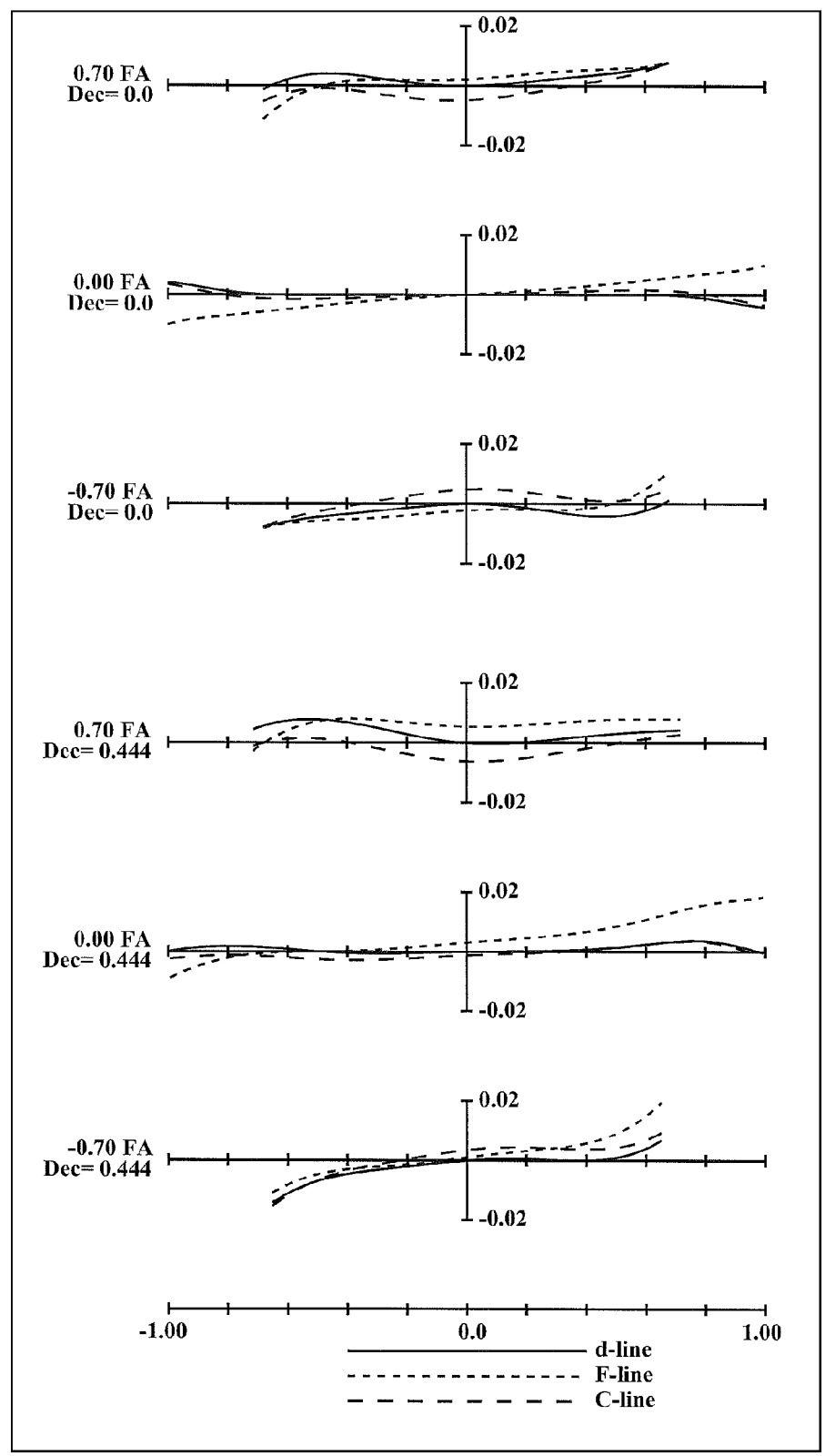
FIG. 20 is a lateral aberration diagram of the zoom lens system according to Numerical Example 5 at a telephoto limit in a basic state where image blur compensation is not performed and in an image blur compensation state.

As shown in FIG. 17, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5 comprises solely a negative meniscus eleventh lens element L11 with the convex surface facing the image side.

The sixth lens unit G6 comprises solely a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3, the fourth lens unit G4, and the fifth lens unit G5 move with locus of a slight convex to the object side, and the second lens unit G2 and the sixth lens unit G6 are fixed with respect to the image surface S. That is, in zooming, the first lens unit G1, the third lens unit G3, the fourth lens unit G4, and the fifth lens unit G5 individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 6

Figure 21:
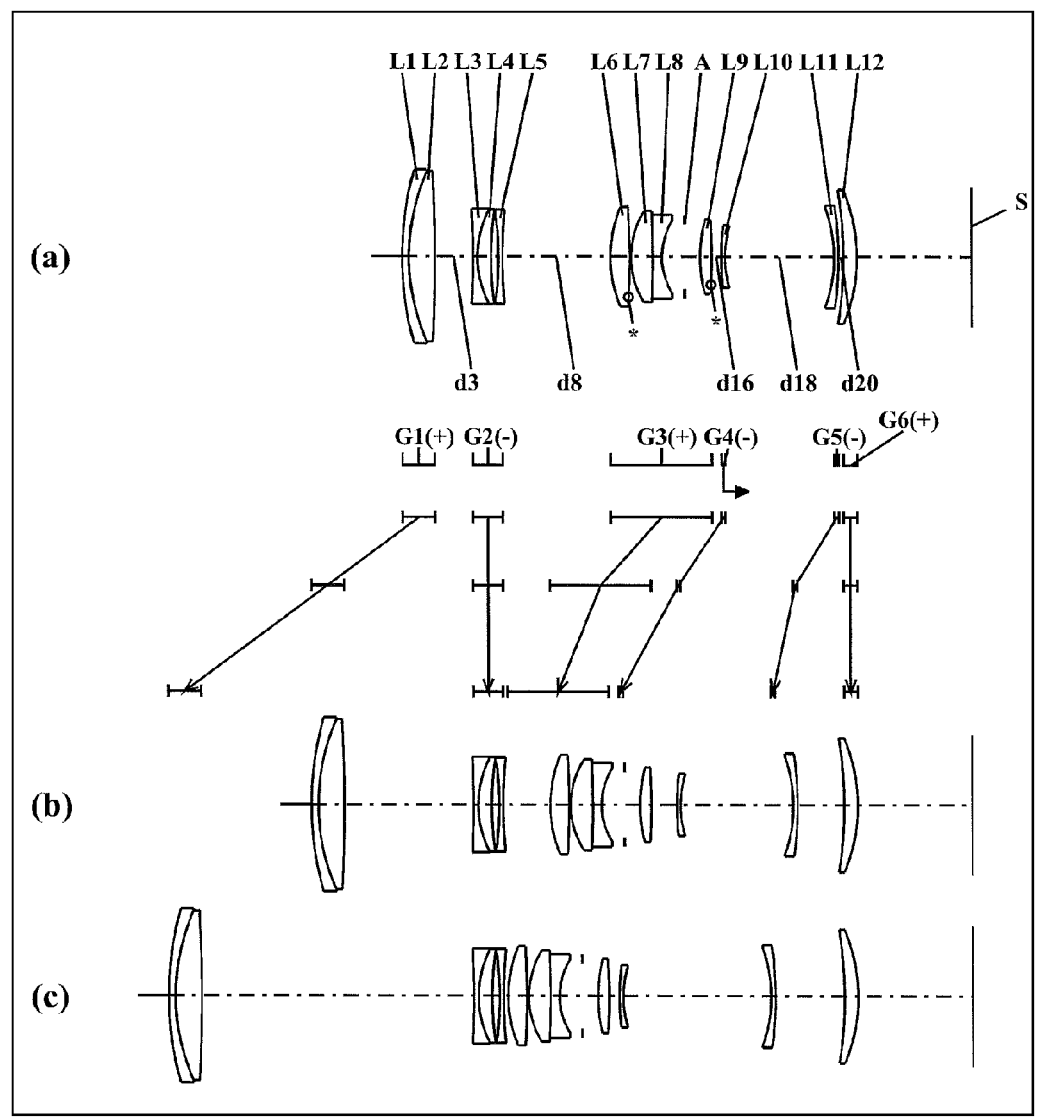
FIG. 21 is a lens arrangement diagram showing an infinity in-focus condition of a zoom lens system according to Embodiment 6 (Numerical Example 6)
Figure 22:
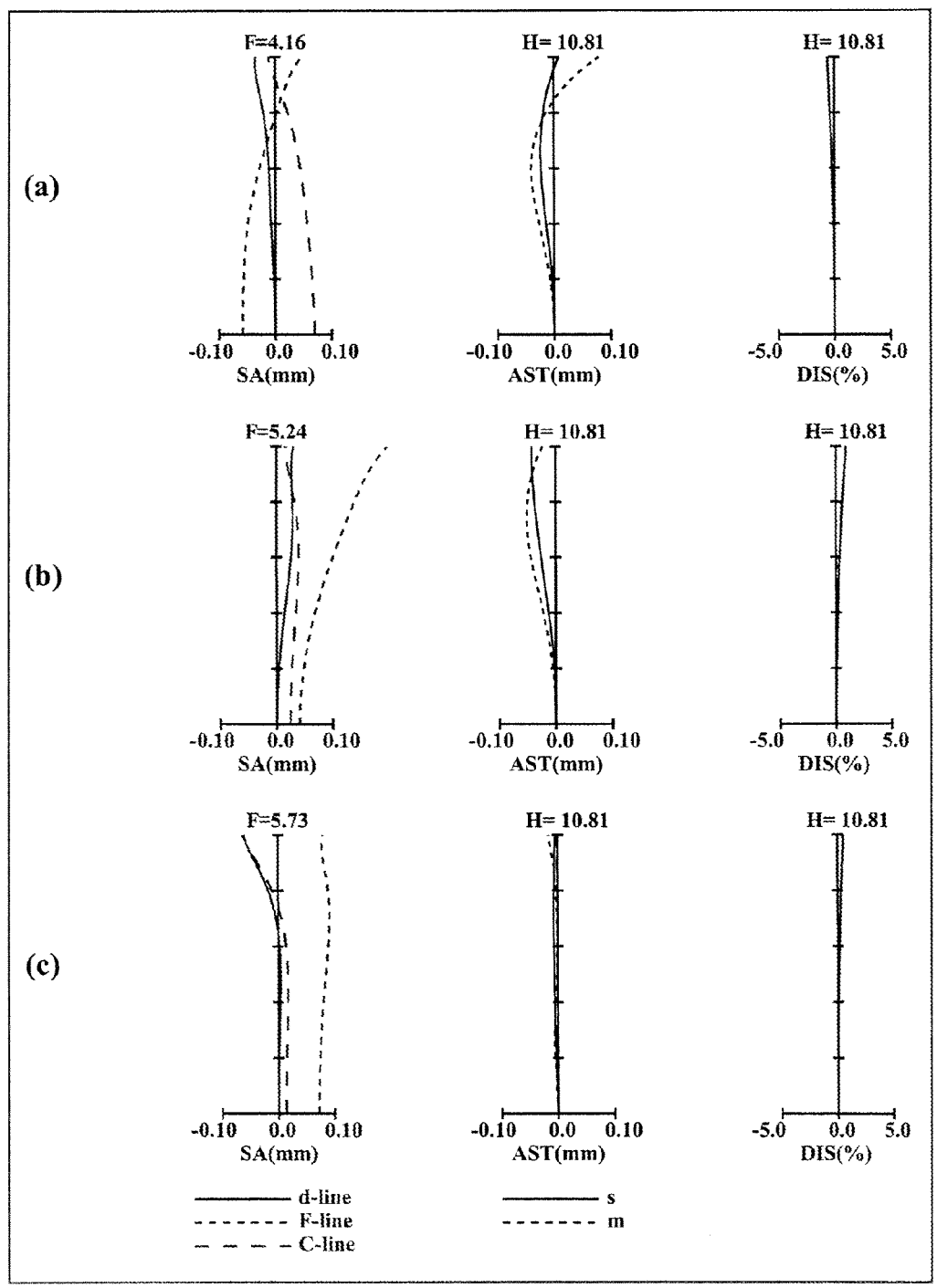
FIG. 22 is a longitudinal aberration diagram of an infinity in-focus condition of the zoom lens system according to Numerical Example 6.
Figure 23:
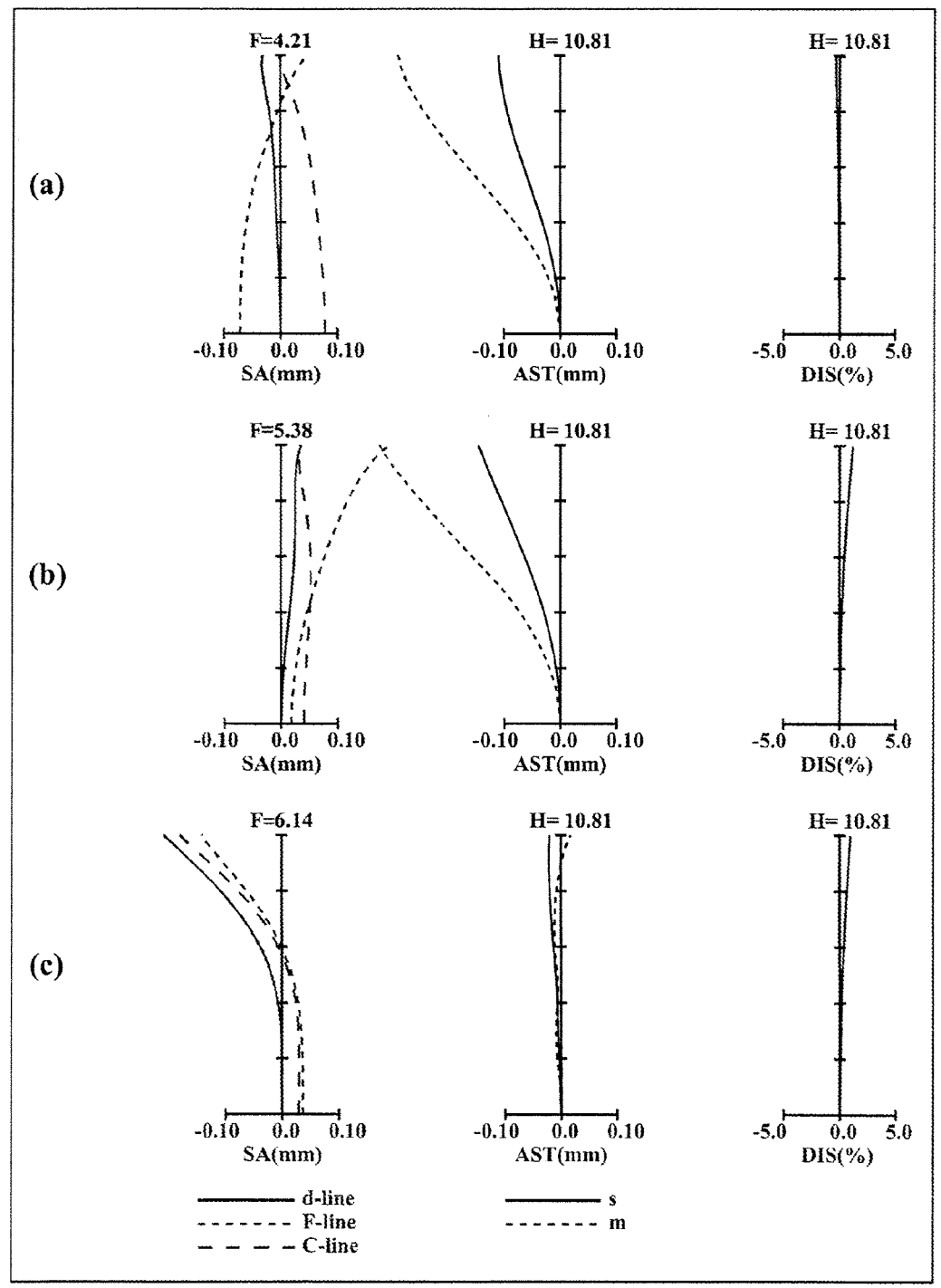
FIG. 23 is a longitudinal aberration diagram of a close-object in-focus condition of the zoom lens system according to Numerical Example 6.
Figure 24:
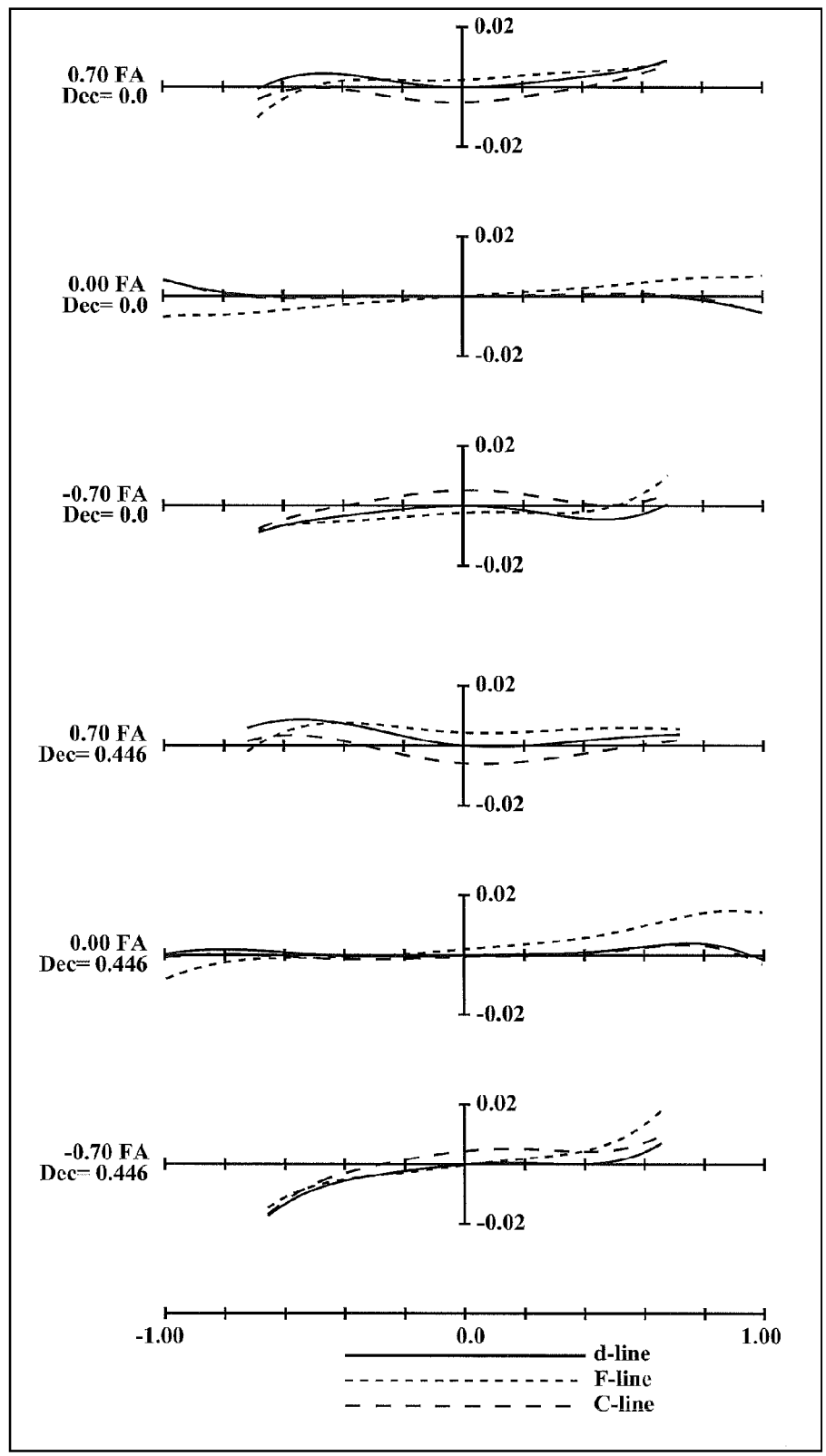
FIG. 24 is a lateral aberration diagram of the zoom lens system according to Numerical Example 6 at a telephoto limit in a basic state where image blur compensation is not performed and in an image blur compensation state.

As shown in FIG. 21, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5 comprises solely a negative meniscus eleventh lens element L11 with the convex surface facing the image side.

The sixth lens unit G6 comprises solely a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3, the fourth lens unit G4, and the fifth lens unit G5 move with locus of a slight convex to the object side, and the second lens unit G2 and the sixth lens unit G6 are fixed with respect to the image surface S. That is, in zooming, the first lens unit G1, the third lens unit G3, the fourth lens unit G4, and the fifth lens unit G5 individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 7

Figure 25:
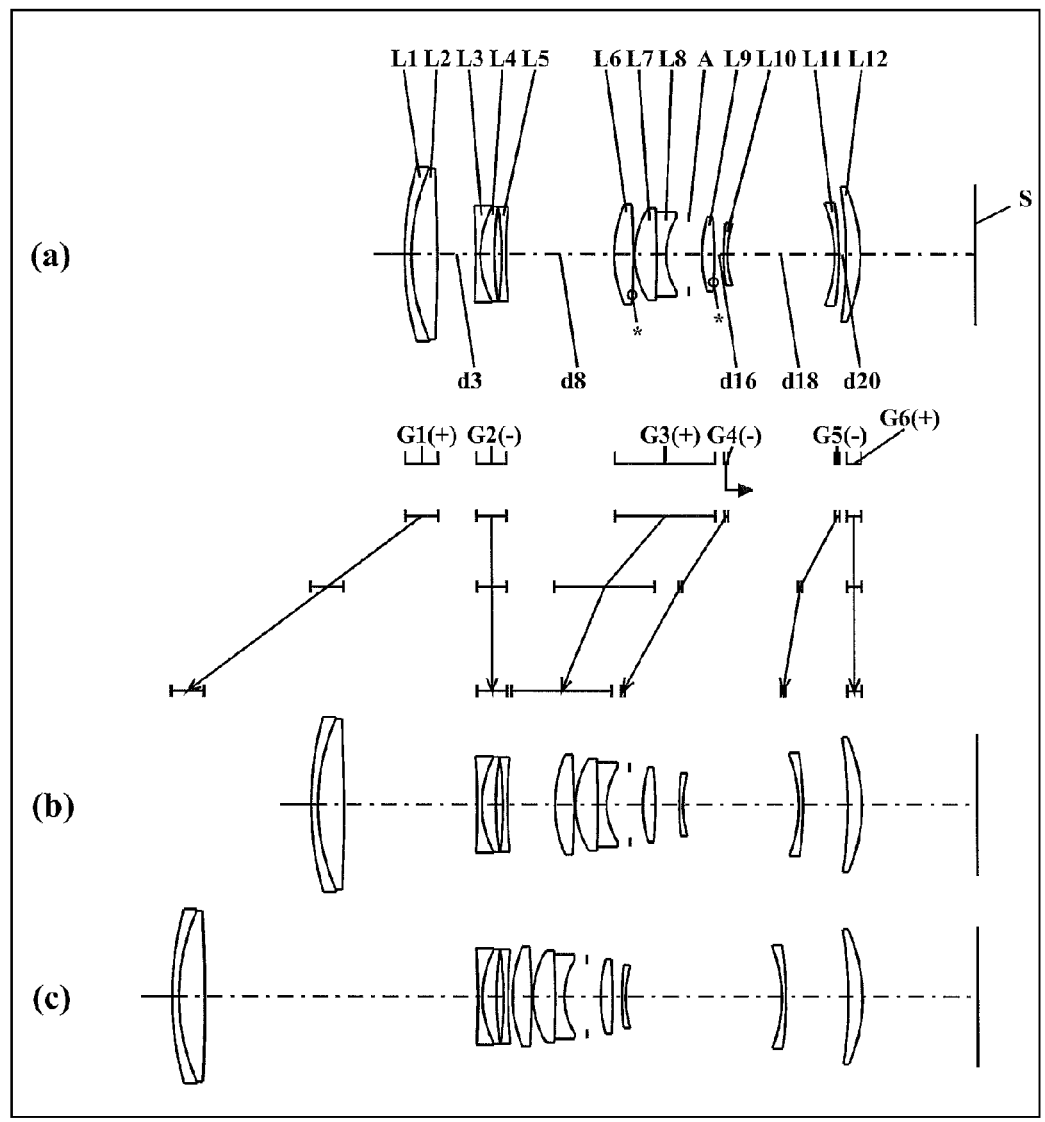
FIG. 25 is a lens arrangement diagram showing an infinity in-focus condition of a zoom lens system according to Embodiment 7 (Numerical Example 7)
Figure 26:
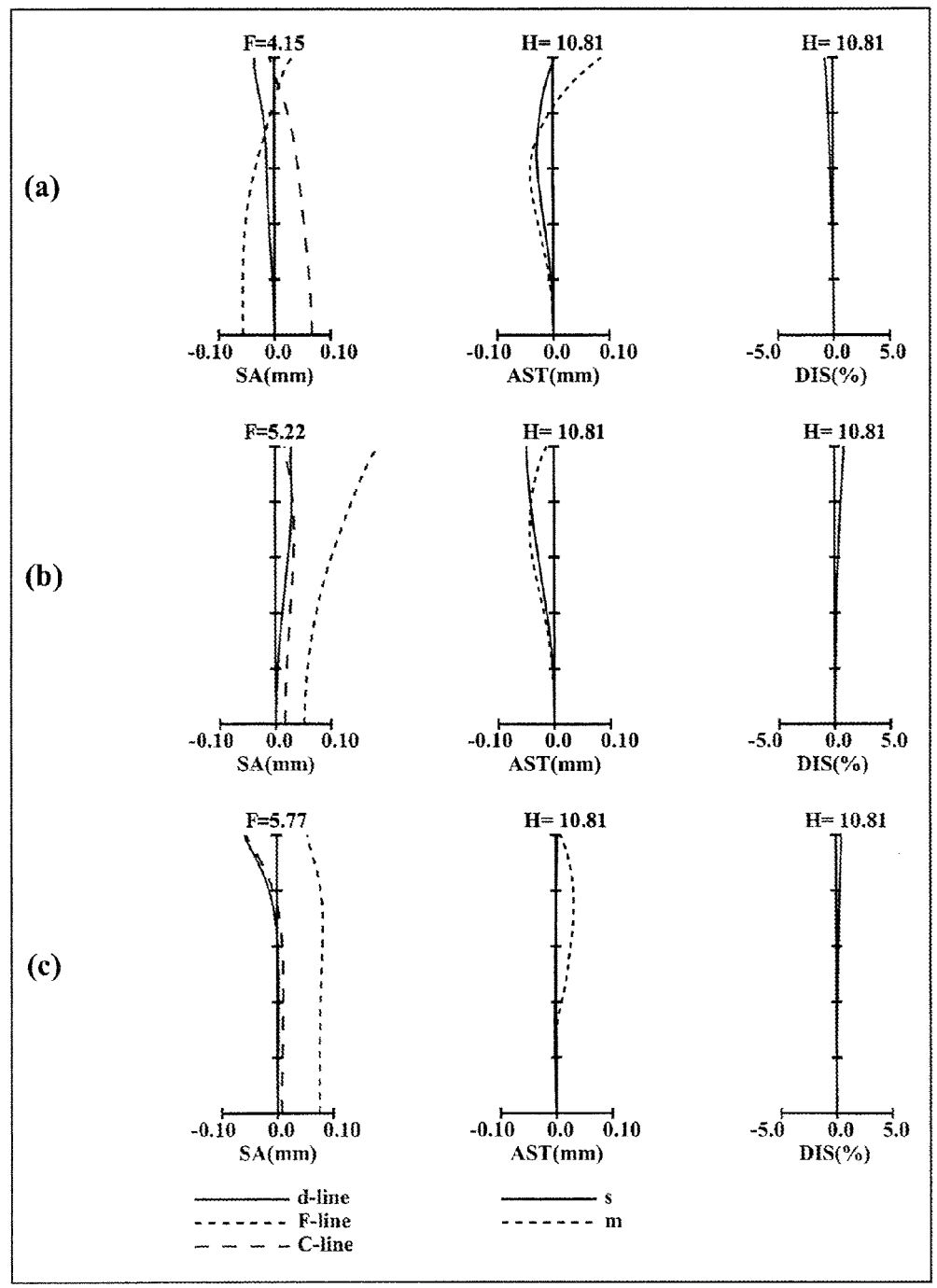
FIG. 26 is a longitudinal aberration diagram of an infinity in-focus condition of the zoom lens system according to Numerical Example 7.
Figure 27:
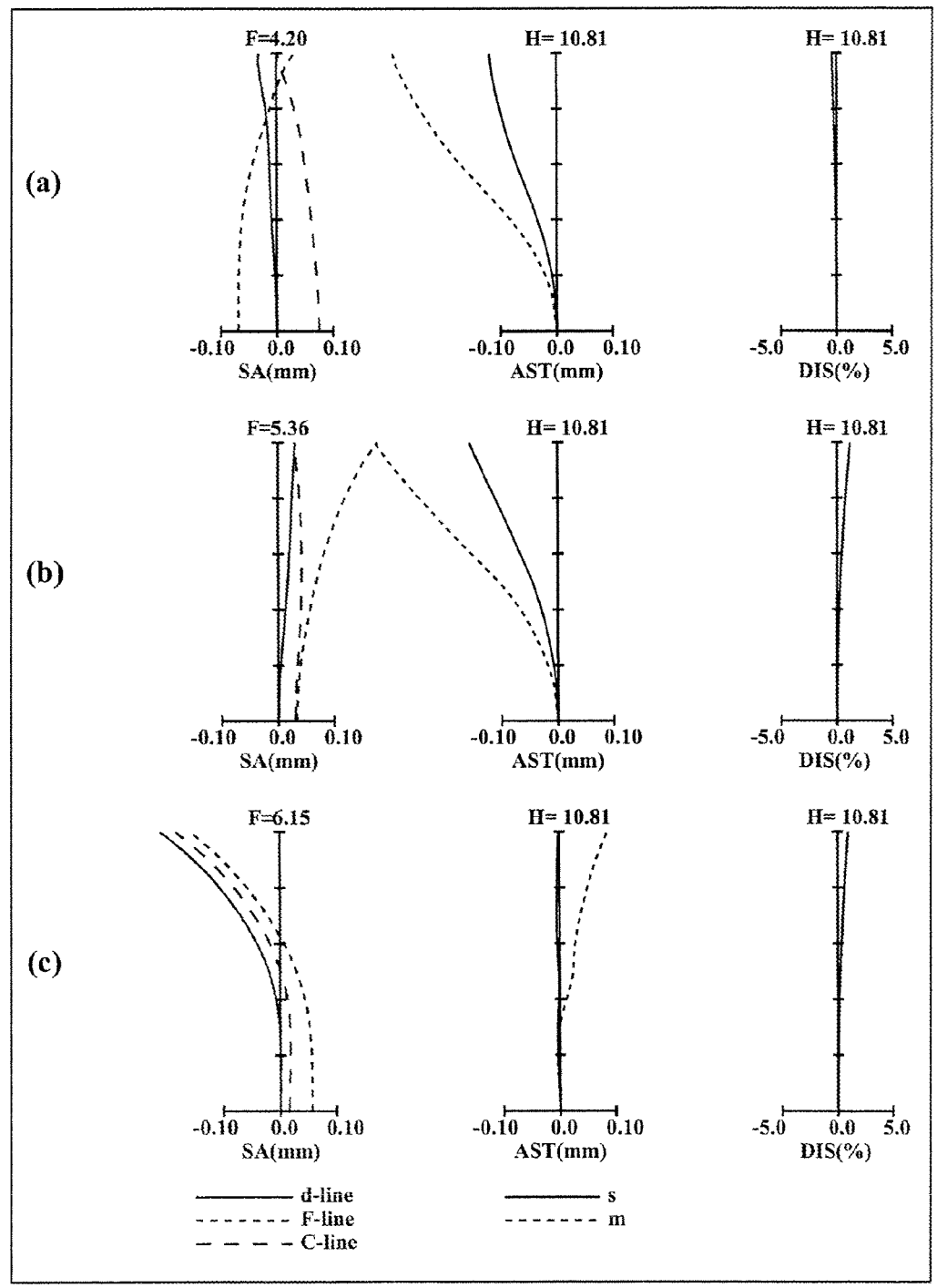
FIG. 27 is a longitudinal aberration diagram of a close-object in-focus condition of the zoom lens system according to Numerical Example 7.
Figure 28:
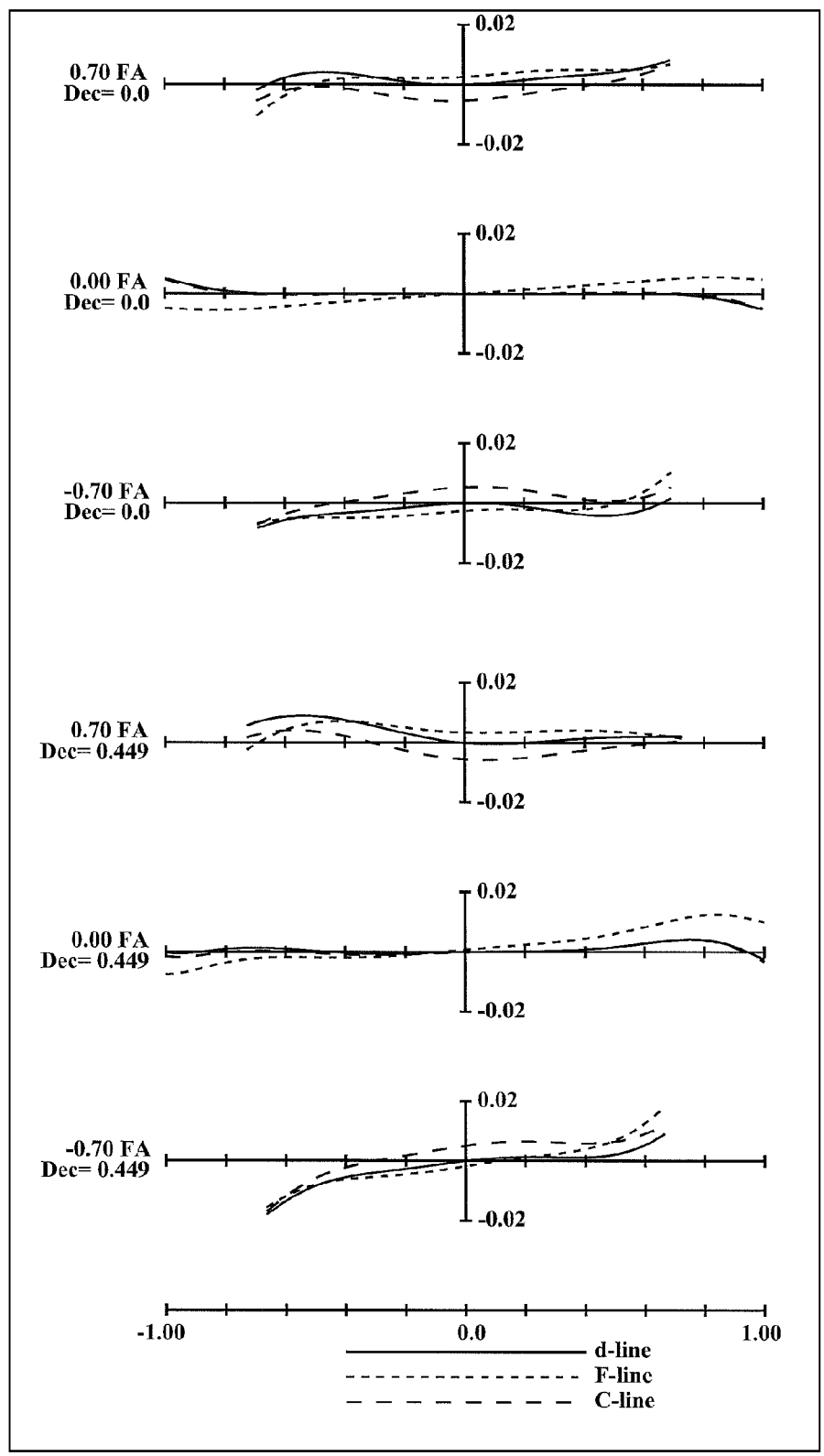
FIG. 28 is a lateral aberration diagram of the zoom lens system according to Numerical Example 7 at a telephoto limit in a basic state where image blur compensation is not performed and in an image blur compensation state.

As shown in FIG. 25, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5 comprises solely a negative meniscus eleventh lens element L11 with the convex surface facing the image side.

The sixth lens unit G6 comprises solely a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3, the fourth lens unit G4, and the fifth lens unit G5 move with locus of a slight convex to the object side, and the second lens unit G2 and the sixth lens unit G6 are fixed with respect to the image surface S. That is, in zooming, the first lens unit G1, the third lens unit G3, the fourth lens unit G4, and the fifth lens unit G5 individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

Embodiment 8

Figure 29:
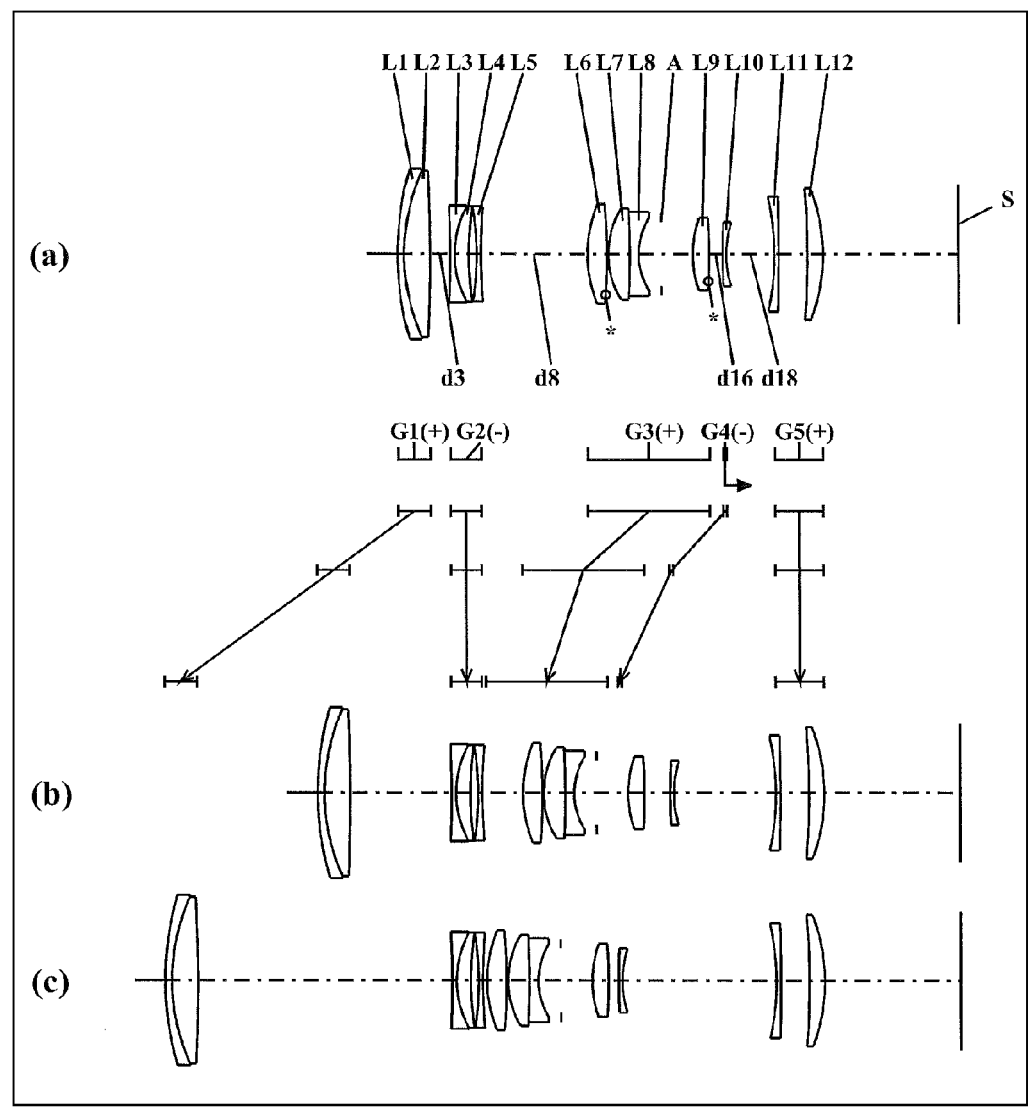
FIG. 29 is a lens arrangement diagram showing an infinity in-focus condition of a zoom lens system according to Embodiment 8 (Numerical Example 8)
Figure 30:
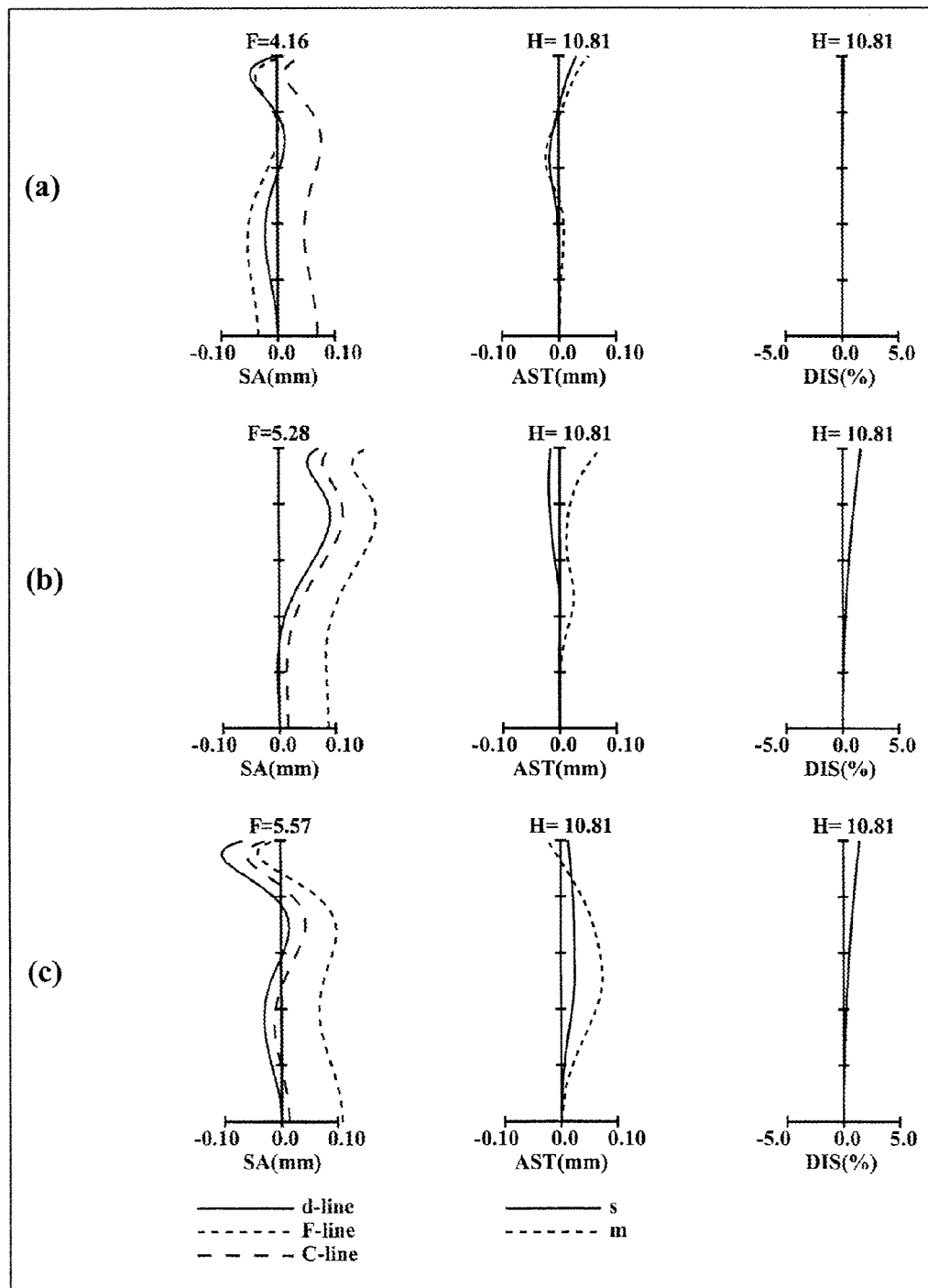
FIG. 30 is a longitudinal aberration diagram of an infinity in-focus condition of the zoom lens system according to Numerical Example 8.
Figure 31:
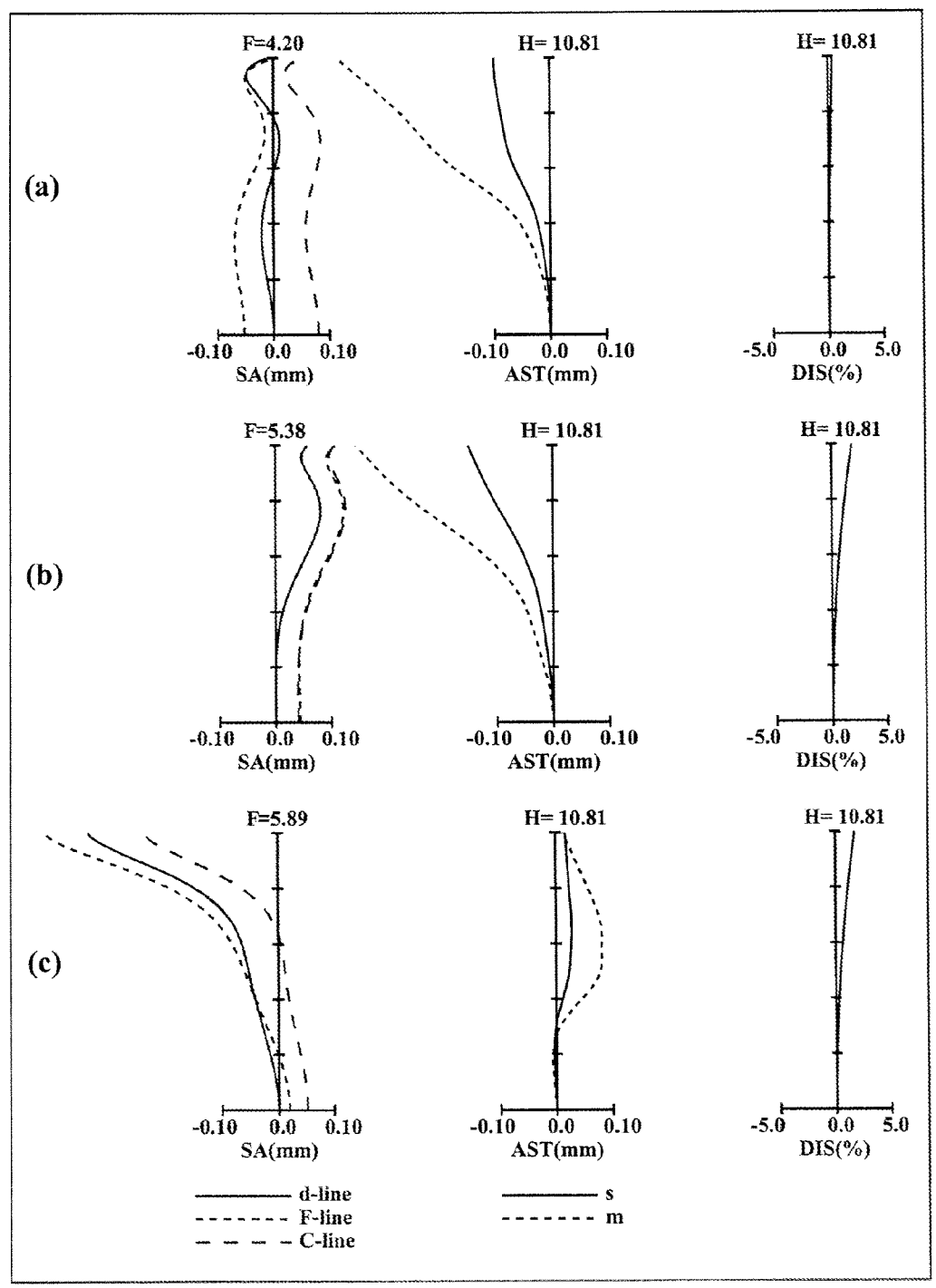
FIG. 31 is a longitudinal aberration diagram of a close-object in-focus condition of the zoom lens system according to Numerical Example 8.
Figure 32:
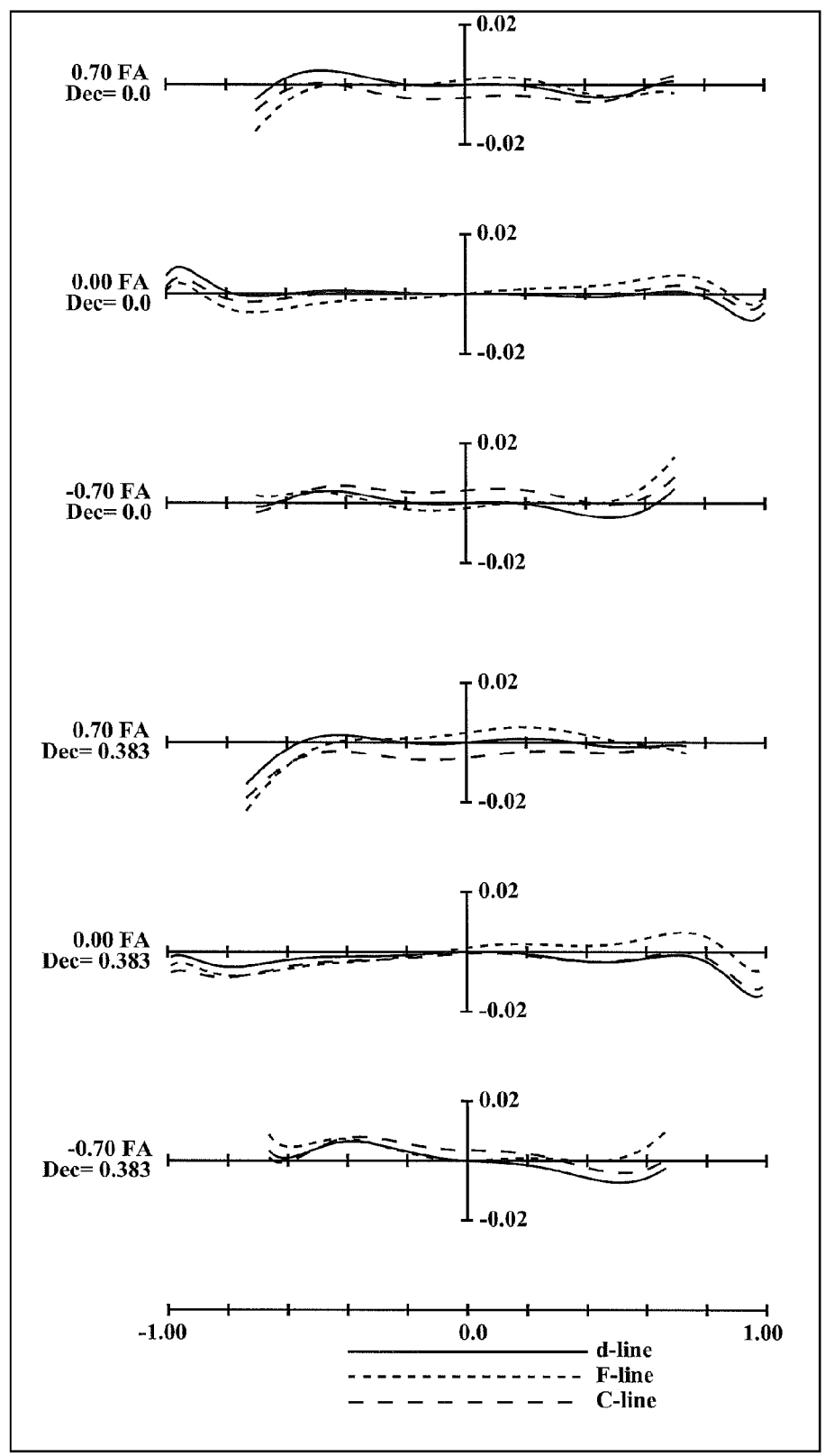
FIG. 32 is a lateral aberration diagram of the zoom lens system according to Numerical Example 8 at a telephoto limit in a basic state where image blur compensation is not performed and in an image blur compensation state.

As shown in FIG. 29, the first lens unit G1, in order from the object side to the image side, comprises: a negative meniscus first lens element L1 with the convex surface facing the object side; and a bi-convex second lens element L2. The first lens element L1 and the second lens element L2 are cemented with each other.

The second lens unit G2, in order from the object side to the image side, comprises: a bi-concave third lens element L3; a positive meniscus fourth lens element L4 with the convex surface facing the object side; and a bi-concave fifth lens element L5. Among these, the third lens element L3 and the fourth lens element L4 are cemented with each other.

The third lens unit G3, in order from the object side to the image side, comprises: a bi-convex sixth lens element L6; a bi-convex seventh lens element L7; a bi-concave eighth lens element L8; and a bi-convex ninth lens element L9. Among these, the seventh lens element L7 and the eighth lens element L8 are cemented with each other. The sixth lens element L6 has an aspheric image side surface, and the ninth lens element L9 has an aspheric image side surface. Further, an aperture diaphragm A is provided between the eighth lens element L8 and the ninth lens element L9.

The fourth lens unit G4 comprises solely a negative meniscus tenth lens element L10 with the convex surface facing the object side.

The fifth lens unit G5, in order from the object side to the image side, comprises: a negative meniscus eleventh lens element L11 with the convex surface facing the image side; and a positive meniscus twelfth lens element L12 with the convex surface facing the image side.

The third lens unit G3 comprises a third-a sub lens unit having positive optical power and a third-b sub lens unit having positive optical power. The third-a sub lens unit comprises the sixth lens element L6, the seventh lens element L7, and the eighth lens element L8. The third-b sub lens unit comprises solely the ninth lens element L9. The ninth lens element L9 corresponds to an image blur compensating lens unit described later, which moves in a direction perpendicular to the optical axis in order to optically compensate image blur.

In zooming from a wide-angle limit to a telephoto limit at the time of image taking, the first lens unit G1 monotonically moves to the object side, the third lens unit G3 and the fourth lens unit G4 move with locus of a slight convex to the object side, and the second lens unit G2 and the fifth lens unit G5 are fixed with respect to the image surface S. That is, in zooming, the first lens unit G1, the third lens unit G3, and the fourth lens unit G4 individually move along the optical axis such that the interval between the first lens unit G1 and the second lens unit G2 and the interval between the fourth lens unit G4 and the fifth lens unit G5 increase, the interval between the second lens unit G2 and the third lens unit G3 decreases, and the interval between the third lens unit G3 and the fourth lens unit G4 varies.

In focusing from an infinity in-focus condition to a close-object in-focus condition, the fourth lens unit G4 as a focusing lens unit moves to the image side along the optical axis in any zooming condition.

The zoom lens system according to each of Embodiments 1 to 8 has a plurality of lens units each comprising at least one lens element, and comprises, in order from the object side to the image side, the first lens unit G1 having positive optical power, the second lens unit G2 having negative optical power, the third lens unit G3 having positive optical power, the fourth lens unit G4 having negative optical power, and the subsequent lens unit. Therefore, the size of the entire lens system can be reduced.

In the zoom lens system according to each of Embodiments 1 to 8, the first lens unit G1 comprises a negative lens element having negative optical power, and a positive lens element having positive optical power. Therefore, chromatic aberration can be minimized.

In the zoom lens system according to each of Embodiments 1 to 8, the negative lens element and the positive lens element are cemented with each other. Therefore, the first lens unit G1 can be easily configured.

In the zoom lens system according to each of Embodiments 1 to 8, the first lens unit G1 comprises, in order from the object side to the image side, the first lens element L1 as the negative lens element, and the second lens element L2 as the positive lens element. Therefore, axial chromatic aberration at a telephoto limit is small.

In the zoom lens system according to each of Embodiments 1 and 3 to 7, the subsequent lens unit comprises, in order from the object side to the image side, the fifth lens unit G5 having negative optical power, and the sixth lens unit G6 having positive optical power. Therefore, aberration fluctuation from an infinity condition to a close condition can be reduced.

In the zoom lens system according to each of Embodiments 1 to 8, in focusing from an infinity in-focus condition to a close-object in-focus condition, the fourth lens unit G4 moves along the optical axis to perform focusing. Therefore, the weight of the fourth lens unit G4 as a focusing lens unit can be reduced, thereby realizing a compact configuration of the zoom lens system.

In the zoom lens system according to each of Embodiments 1 to 8, in zooming from a wide-angle limit to a telephoto limit at the time of image taking, the second lens unit G2 is fixed with respect to the image surface S, and therefore, is not likely to be decentered. Thereby, aberration fluctuation due to decentering in manufacturing can be minimized.

In the zoom lens system according to each of Embodiments 1 to 8, the third lens unit G3 comprises, in order from the object side to the image side, the third-a sub lens unit having positive optical power and the third-b sub lens unit having positive optical power. The third-b sub lens unit moves in a direction perpendicular to the optical axis in order to optically compensate image blur. Thereby, the third-b sub lens unit as an image blur compensating lens unit can be configured with less number of lens elements.

It is beneficial to include an image blur compensating lens unit, like the zoom lens system according to each of Embodiments 1 to 8. The image blur compensating lens unit can compensate image point movement caused by vibration of the entire system.

When compensating image point movement caused by vibration of the entire system, the image blur compensating lens unit moves in the direction perpendicular to the optical axis. Therefore, image blur compensation can be performed in a state that size increase in the entire zoom lens system is suppressed to realize a compact construction, and that excellent imaging characteristics such as small decentering coma aberration and small decentering astigmatism are satisfied.

In the zoom lens system according to each of Embodiments 1 to 8, an aperture diaphragm A is provided between the third-a sub lens unit and the third-b sub lens unit. Therefore, the diameter of the aperture diaphragm A can be reduced.

In the zoom lens system according to each of Embodiments 1 to 8, the third-b sub lens unit is composed of one lens element having an aspheric surface. Therefore, coma aberration that occurs during image blur compensation can be suppressed by the aspheric surface. Further, since the third-b sub lens unit is composed of one lens element, the third-b sub lens unit is light weight, and size-reduction of an actuator for the image blur compensating lens unit can be achieved.

In the zoom lens system according to each of Embodiments 1 to 8, the third-a sub lens unit comprises at least two positive lens elements, each lens element having positive optical power, and the refractive index to the d-line of each of the at least two positive lens elements is 1.7 or more. Thereby, spherical aberration at a telephoto limit can be successfully compensated.

As described above, Embodiments 1 to 8 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 8 can satisfy. Here, a plurality of conditions are set forth for the zoom lens system according to each embodiment. A construction that satisfies all the plural conditions is most effective for the zoom lens system. However, when an individual condition is satisfied, a zoom lens system having the corresponding effect is obtained.

For example, in a zoom lens system like the zoom lens systems according to Embodiments 1 to 8, which has a plurality of lens units, each lens unit comprising at least one lens element, and comprises, in order from an object side to an image side, a first lens unit having positive optical power, a second lens unit having negative optical power, a third lens unit having positive optical power, a fourth lens unit having negative optical power, and a subsequent lens unit, wherein the first lens unit comprises a negative lens element having negative optical power and a positive lens element having positive optical power (this lens configuration is referred to as a basic configuration of the embodiment, hereinafter), the following conditions (1) and (2) are satisfied.

$$1.47 < nd_2 < 1.57 \quad (1)$$

$$60 < vd_2 < 75 \quad (2)$$

where
$nd_2$ is the refractive index to the d-line of the positive lens element, and
$vd_2$ is the Abbe number to the d-line of the positive lens element.

The condition (1) sets forth the refractive index of the positive lens element in the first lens unit. When the value goes below the lower limit of the condition (1), the radius of curvature of the positive lens element is reduced, and the thickness of the positive lens element is increased in order to secure a sufficient edge thickness. Thereby, the overall length of lens system is increased. When the value exceeds the upper limit of the condition (1), the gravity is increased, and the weight of the positive lens element is increased.

The condition (2) sets forth the Abbe number of the positive lens element in the first lens unit. When the value goes below the lower limit of the condition (2), chromatic aberration cannot be successfully compensated. When the value exceeds the upper limit of the condition (2), the cost of glass material for the lens element increases.

It is beneficial that a zoom lens system having the basic configuration like the zoom lens systems according to Embodiments 1 to 8 satisfies the following condition (3).

$$28 < vd_1 < 40 \quad (3)$$

where
$vd_1$ is the Abbe number to the d-line of the negative lens element.

The condition (3) sets forth the Abbe number of the negative lens element in the first lens unit. When the value goes below the lower limit of the condition (3), chromatic aberration cannot be successfully compensated. Also when the value exceeds the upper limit of the condition (3), chromatic aberration cannot be successfully compensated.

When at least one of the following conditions (3)' and (3)" is further satisfied, the above-mentioned effect is achieved more successfully.

$$30 < vd_1 \quad (3)'$$

$$vd_1 < 38 \quad (3)''$$

It is beneficial that a zoom lens system having the basic configuration like the zoom lens systems according to Embodiments 1 to 8 satisfies the following condition (4).

$$0.60 < sp < 0.95 \quad (4)$$

where $$sp = (R_{2R} + R_{2F})/(R_{2R} - R_{2F}),$$

$R_{2F}$ is the radius of curvature of the object side surface of the positive lens element, and
$R_{2R}$ is the radius of curvature of the image side surface of the positive lens element.

The condition (4) sets forth the shape factor of the positive lens element in the first lens unit. When the value goes below the lower limit of the condition (4), axial chromatic aberration at a telephoto limit cannot be successfully compensated. When the value exceeds the upper limit of the condition (4), magnification chromatic aberration at a telephoto limit cannot be successfully compensated.

When at least one of the following conditions (4)' and (4)" is further satisfied, the above-mentioned effect is achieved more successfully.

$$0.70 < sp \quad (4)'$$

$$sp < 0.85 \quad (4)''$$

It is beneficial that a zoom lens system having the basic configuration like the zoom lens systems according to Embodiments 1 to 8 satisfies the following condition (5).

$$0.5 < f_T/f_R < 3.0 \quad (5)$$

where
$f_T$ is the focal length of the entire system at a telephoto limit, and
$f_R$ is the composite focal length of the subsequent lens unit at a telephoto limit.

The condition (5) sets forth the relationship between the focal length of the entire system at a telephoto limit and the composite focal length of the subsequent lens unit at a telephoto limit. When the value goes below the lower limit of the condition (5), magnification chromatic aberration at the telephoto limit cannot be successfully compensated. When the value exceeds the upper limit of the condition (5), axial chromatic aberration at the telephoto limit cannot be successfully compensated.

When at least one of the following conditions (5)' and (5)"
is further satisfied, the above-mentioned effect is achieved
more successfully.

$$1.3 < f_T/f_R \qquad (5)'$$

$$f_T/f_R < 2.0 \qquad (5)''$$

It is beneficial that a zoom lens system having the basic
configuration like the zoom lens systems according to
Embodiments 1 to 8 satisfies the following condition (6).

$$0.6 < f_1/f_T < 0.9 \qquad (6)$$

where $f_1$ is the focal length of the first lens unit, and $f_T$ is the focal length of the entire system at a telephoto
limit.

The condition (6) sets forth the relationship between the
focal length of the first lens unit and the focal length of the
entire system at a telephoto limit. When the value goes below
the lower limit of the condition (6), the error sensitivity of the
first lens unit is increased, which makes manufacturing difficult. When the value exceeds the upper limit of the condition
(6), the overall length of lens system at the telephoto limit is
increased.

When at least one of the following conditions (6)' and (6)"
is further satisfied, the above-mentioned effect is achieved
more successfully.

$$0.7 < f_1/f_T \qquad (6)'$$

$$f_1/f_T < 0.8 \qquad (6)''$$

In a zoom lens system like the zoom lens systems according to Embodiments 1 to 8, which has the basic configuration,
and in which the third lens unit comprises, in order from the
object side to the image side, the third-a sub lens unit having
positive optical power and the third-b sub lens unit having
positive optical power, and the third-b sub lens unit is an
image blur compensating lens unit which moves in a direction
perpendicular to the optical axis in order to optically compensate image blur, it is beneficial to satisfy the following
conditions (7) and (8).

$$0.8 < f_{3a}/f_{3b} < 1.4 \qquad (7)$$

$$0.1 < f_{3b}/\sqrt{(f_W \cdot f_T)} < 0.6 \qquad (8)$$

where $f_{3a}$ is a focal length of the third-a sub lens unit, $f_{3b}$ is a focal length of the third-b sub lens unit, $f_W$ is a focal length of the zoom lens system at a wide-angle
limit, and $f_T$ is a focal length of the zoom lens system at a telephoto
limit.

The condition (7) sets forth the relationship between the
focal length of the third-a sub lens unit and the focal length of
the third-b sub lens unit. When the value goes below the lower
limit of the condition (7), the amount of movement of the
third-b sub lens unit as an image blur compensating lens unit
is increased, and a lens barrel is increased in size. When the
value exceeds the upper limit of the condition (7), the error
sensitivity of the third-b sub lens unit as an image blur compensating lens unit is increased, which makes manufacturing
difficult.

When at least one of the following conditions (7)' and (7)"
is further satisfied, the above-mentioned effect is achieved
more successfully.

$$0.85 < f_{3a}/f_{3b} \qquad (7)'$$

$$f_{3a}/f_{3b} < 1.1 \qquad (7)''$$

The condition (8) sets forth the relationships between the
focal length of the third-b sub lens unit, and the focal lengths
of the entire system at the wide-angle limit and the telephoto
limit. When the value goes below the lower limit of the
condition (8), the error sensitivity of the third-b sub lens unit
as an image blur compensating lens unit is increased, which
makes manufacturing difficult. When the value exceeds the
upper limit of the condition (8), the amount of movement of
the third-b sub lens unit as an image blur compensating lens
unit is increased, and a lens barrel is increased in size.

When at least one of the following conditions (8)' and (8)"
is further satisfied, the above-mentioned effect is achieved
more successfully.

$$0.3 < f_{3b}/\sqrt{(f_W \cdot f_T)} \qquad (8)'$$

$$f_{3b}/\sqrt{(f_W \cdot f_T)} < 0.5 \qquad (8)''$$

In a zoom lens system like the zoom lens systems according to Embodiments 1 to 8, which has the basic configuration,
and in which the third lens unit comprises, in order from the
object side to the image side, the third-a sub lens unit having
positive optical power and the third-b sub lens unit having
positive optical power, and the third-b sub lens unit is an
image blur compensating lens unit which moves in a direction
perpendicular to the optical axis in order to optically compensate image blur, it is beneficial to satisfy the following
condition (9).

$$0.7 < D_O/D_3 < 0.95 \qquad (9)$$

where $D_O$ is the optical axial distance from the most object side
lens surface in the third-a sub lens unit to the most object side
lens surface in the third-b sub lens unit, and $D_3$ is the optical axial distance from the most object side
lens surface in the third lens unit to the most image side lens
surface in the third lens unit.

The condition (9) sets forth the relationship between the
axial distance from the most object side lens surface in the
third-a sub lens unit to the most object side lens surface in the
third-b sub lens unit, and the axial distance from the most
object side lens surface in the third lens unit to the most image
side lens surface in the third lens unit. When the value goes
below the lower limit of the condition (9), the error sensitivity
of the third-b sub lens unit as an image blur compensating lens
unit is increased, which makes manufacturing difficult. When
the value exceeds the upper limit of the condition (9), the
thickness of the third lens unit is excessively increased, and
the overall length of lens system is increased.

When at least one of the following conditions (9)' and (9)"
is further satisfied, the above-mentioned effect is achieved
more successfully.

$$0.8 < D_O/D_3 \qquad (9)'$$

$$D_O/D_3 < 0.9 \qquad (9)''$$

In a zoom lens system like the zoom lens systems according to Embodiments 1 to 8, which has the basic configuration,
and in which the third lens unit comprises, in order from the
object side to the image side, the third-a sub lens unit having
positive optical power and the third-b sub lens unit having
positive optical power, and the third-b sub lens unit is an
image blur compensating lens unit which moves in a direction
perpendicular to the optical axis in order to optically compensate image blur, and the third-b sub lens unit is composed
of one lens element having an aspheric surface, it is beneficial
to satisfy the following condition (10).

$$60 < v d_O < 85 \qquad (10)$$

where vd$_O$ is the Abbe number to the d-line of the lens element having an aspheric surface.

The condition (10) sets forth the Abbe number of the one lens element having an aspheric surface, which lens element constitutes the third-b sub lens unit. When the value goes below the lower limit of the condition (10), chromatic aberration that occurs during image blur compensation is increased, which makes it difficult to constitute the image blur compensating lens unit by one lens element. When the value exceeds the upper limit of the condition (10), the cost of glass material for the lens element increases.

The individual lens units constituting the zoom lens systems according to Embodiments 1 to 8 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 9

Figure 33:
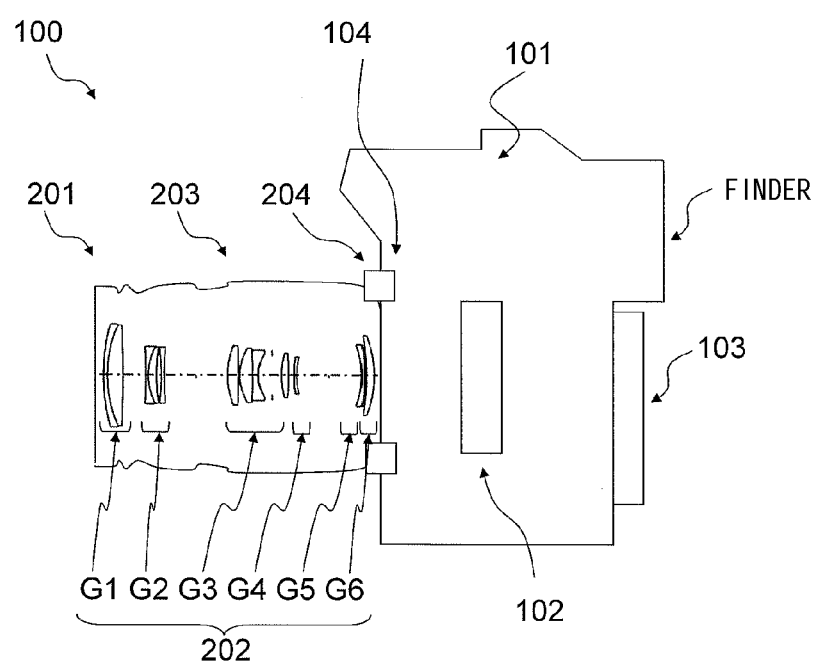
FIG. 33 is a schematic construction diagram of an interchangeable-lens type digital camera system according to Embodiment 9.

FIG. 33 is a schematic construction diagram of an interchangeable-lens type digital camera system according to Embodiment 9.

The interchangeable-lens type digital camera system 100 according to Embodiment 9 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 8; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 33, the zoom lens system according to Embodiment 1 is employed as the zoom lens system 202.

In Embodiment 9, since the zoom lens system 202 according to any of Embodiments 1 to 8 is employed, a compact interchangeable lens apparatus having excellent imaging performance can be realized at low cost. Moreover, size reduction and cost reduction of the entire camera system 100 according to Embodiment 9 can be achieved. In the zoom lens systems according to Embodiments 1 to 8, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 8.

As described above, Embodiment 9 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 8 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, K is a conic constant, and $A_n$ is a n-th order aspherical coefficient.

FIGS. 2, 6, 10, 14, 18, 22, 26, and 30 are longitudinal aberration diagrams of an infinity in-focus condition of the zoom lens systems according to Numerical Examples 1 to 8, respectively.

FIGS. 3, 7, 11, 15, 19, 23, 27, and 31 are longitudinal aberration diagrams of a close-object in-focus condition of the zoom lens systems according to Numerical Examples 1 to 8, respectively. The object distance in each of Numerical Examples 1 to 8 is 1000 mm In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 4, 8, 12, 16, 20, 24, 28, and 32 are lateral aberration diagrams of the zoom lens systems at a telephoto limit according to Numerical Examples 1 to 8, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (the ninth lens element L9 in the third lens unit G3) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

In the zoom lens system according to each Numerical Example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.4436 |
| 2 | 0.3810 |
| 3 | 0.4500 |
| 4 | 0.4457 |
| 5 | 0.4437 |
| 6 | 0.4457 |
| 7 | 0.4486 |
| 8 | 0.3833 |

When the shooting distance is infinity, at a telephoto limit, the amount of image decentering in a case that the zoom lens system inclines by a predetermined angle is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to a predetermined angle without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus condition. Table 4 shows various data in a close-object in-focus condition.

TABLE 1

(Surface data)

| Surface number | r | d | nd | vd |
|---|---|---|---|---|
| Object surface | ∞ | | | |
| 1 | 50.91900 | 1.10000 | 1.80610 | 33.3 |
| 2 | 33.61280 | 4.23280 | 1.51680 | 64.2 |
| 3 | −270.56400 | Variable | | |
| 4 | −154.15760 | 0.70000 | 1.80610 | 33.3 |
| 5 | 16.15050 | 2.23240 | 1.94595 | 18.0 |
| 6 | 51.47560 | 1.14050 | | |
| 7 | −56.43470 | 0.70000 | 1.72825 | 28.3 |
| 8 | 75.98870 | Variable | | |
| 9 | 20.74390 | 3.03300 | 1.80998 | 40.9 |
| 10* | −112.64950 | 0.29220 | | |
| 11 | 13.93390 | 3.52110 | 1.72916 | 54.7 |
| 12 | −141.73600 | 1.46810 | 2.00100 | 29.1 |
| 13 | 11.20020 | 3.66440 | | |
| 14 (Diaphragm) | ∞ | 2.60270 | | |
| 15 | 22.18820 | 1.92460 | 1.51760 | 63.5 |
| 16* | −80.76840 | Variable | | |
| 17 | 40.25240 | 0.60000 | 1.77250 | 49.6 |
| 18 | 17.31400 | Variable | | |
| 19 | −23.04430 | 0.70000 | 1.48749 | 70.4 |
| 20 | −50.20350 | Variable | | |
| 21 | −64.61270 | 2.13720 | 1.84666 | 23.8 |
| 22 | −27.96670 | 18.38110 | | |
| 23 | ∞ | (BF) | | |
| Image surface | ∞ | | | |

TABLE 2

(Aspherical data)

Surface No. 10

K = 0.00000E+00, A4 = 1.26572E−05, A6 = 6.44750E−10,
A8 = −3.30806E−10 A10 = 2.05826E−12

Surface No. 16

K = 0.00000E+00, A4 = 1.34361E−05, A6 = −2.31660E−07,
A8 = 8.10613E−09 A10 = −9.04381E−11

TABLE 3

(Various data in an infinity in-focus condition)

Zooming ratio 3.17180

| | Wide-angle limit | Middle position | Telephoto limit |
|---|---|---|---|
| Focal length | 45.4003 | 80.8558 | 144.0007 |
| F-number | 4.16055 | 5.26971 | 5.72474 |
| View angle | 13.4581 | 7.5469 | 4.2736 |
| Image height | 10.8150 | 10.8150 | 10.8150 |
| Overall length of lens system | 91.9004 | 106.2012 | 129.2938 |

TABLE 3-continued (Various data in an infinity in-focus condition)

| | | | |
|---|---|---|---|
| BF | 0.00000 | 0.00000 | 0.00000 |
| d3 | 6.2201 | 20.5205 | 43.6127 |
| d8 | 17.4250 | 7.4271 | 0.7122 |
| d16 | 1.5276 | 4.2263 | 1.7229 |
| d18 | 17.8470 | 17.6411 | 22.1275 |
| d20 | 0.4500 | 7.9550 | 12.6869 |

Zoom lens unit data

| Lens unit | Initial surface No. | Focal length |
|---|---|---|
| 1 | 1 | 109.17225 |
| 2 | 4 | −26.43474 |
| 3 | 9 | 21.49938 |
| 4 | 17 | −39.78385 |
| 5 | 19 | −88.12502 |
| 6 | 21 | 56.72333 |

TABLE 4

(Various data in a close-object in-focus condition)

| | Wide-angle limit | Middle position | Telephoto limit |
|---|---|---|---|
| Object distance | 1000.0000 | 1000.0000 | 1000.0000 |
| BF | 0.00000 | 0.00000 | 0.00000 |
| d3 | 6.2201 | 20.5205 | 43.6127 |
| d8 | 17.4250 | 7.4271 | 0.7122 |
| d16 | 2.3672 | 6.3199 | 6.8701 |
| d18 | 17.0075 | 15.5475 | 16.9803 |
| d20 | 0.4500 | 7.9550 | 12.6869 |

NUMERICAL EXAMPLE 2

The zoom lens system of Numerical Example 2 corresponds to Embodiment 2 shown in FIG. 5. Table 5 shows the surface data of the zoom lens system of Numerical Example 2. Table 6 shows the aspherical data. Table 7 shows various data in an infinity in-focus condition. Table 8 shows various data in a close-object in-focus condition.

TABLE 5

(Surface data)

| Surface number | r | d | nd | vd |
|---|---|---|---|---|
| Object surface | ∞ | | | |
| 1 | 49.57110 | 1.10000 | 1.80610 | 33.3 |
| 2 | 33.31630 | 4.20950 | 1.51680 | 64.2 |
| 3 | −271.98770 | Variable | | |
| 4 | −146.81850 | 0.70000 | 1.80610 | 33.3 |
| 5 | 16.26030 | 2.34100 | 1.94595 | 18.0 |
| 6 | 55.89910 | 1.21760 | | |
| 7 | −49.01620 | 0.70000 | 1.72825 | 28.3 |
| 8 | 85.06650 | Variable | | |
| 9 | 21.24530 | 3.19370 | 1.80998 | 40.9 |
| 10* | −79.75560 | 0.20000 | | |
| 11 | 14.21100 | 3.53270 | 1.72916 | 54.7 |
| 12 | −146.44710 | 1.44670 | 2.00100 | 29.1 |
| 13 | 11.12230 | 3.71130 | | |
| 14(Diaphragm) | ∞ | 5.10140 | | |
| 15 | 17.53380 | 2.70300 | 1.51760 | 63.5 |
| 16* | −72.24880 | Variable | | |
| 17 | 111.25710 | 0.60000 | 1.83400 | 37.3 |
| 18 | 16.85140 | Variable | | |
| 19 | −40.92810 | 0.70000 | 1.48749 | 70.4 |
| 20 | −521.63620 | 4.59330 | | |
| 21 | −132.86570 | 2.51560 | 1.84666 | 23.8 |

TABLE 5-continued (Surface data)

| Surface number | r | d | nd | vd |
|---|---|---|---|---|
| 22 | −29.67110 | 22.05630 | | |
| 23 | ∞ | (BF) | | |
| Image surface | ∞ | | | |

TABLE 6

(Aspherical data)

Surface No. 10

$K = 0.00000E+00, A4 = 1.24416E-05, A6 = 5.59677E-08,$
$A8 = -1.41124E-09\ A10 = 9.68825E-12$

Surface No. 16

$K = 0.00000E+00, A4 = 2.75014E-05, A6 = -7.51585E-07,$
$A8 = 2.88021E-08\ A10 = -3.88866E-10$

TABLE 7

(Various data in an infinity in-focus condition)

Zooming ratio 3.17179

| | Wide-angle limit | Middle position | Telephoto limit |
|---|---|---|---|
| Focal length | 45.3998 | 80.8547 | 143.9986 |
| F-number | 4.16074 | 5.29334 | 5.58761 |
| View angle | 13.3746 | 7.4975 | 4.2325 |
| Image height | 10.8150 | 10.8150 | 10.8150 |
| Overall length of lens system | 91.8120 | 104.8182 | 129.8995 |
| BF | 0.00000 | 0.00000 | 0.00000 |
| d3 | 3.4970 | 16.5038 | 41.5857 |
| d8 | 17.4940 | 6.6305 | 0.6676 |
| d16 | 2.1312 | 4.1244 | 1.6441 |
| d18 | 8.0680 | 16.9379 | 25.3811 |

Zoom lens unit data

| Lens unit | Initial surface No. | Focal length |
|---|---|---|
| 1 | 1 | 105.20939 |
| 2 | 4 | −26.56821 |
| 3 | 9 | 21.38715 |
| 4 | 17 | −23.88119 |
| 5 | 19 | 76.21576 |

TABLE 8

(Various data in a close-object in-focus condition)

| | Wide-angle limit | Middle position | Telephoto limit |
|---|---|---|---|
| Object distance | 1000.0000 | 1000.0000 | 1000.0000 |
| BF | 0.00000 | 0.00000 | 0.00000 |
| d3 | 3.4970 | 16.5038 | 41.5857 |
| d8 | 17.4940 | 6.6305 | 0.6676 |
| d16 | 2.6634 | 5.3801 | 4.7363 |
| d18 | 7.5358 | 15.6822 | 22.2889 |

NUMERICAL EXAMPLE 3

The zoom lens system of Numerical Example 3 corresponds to Embodiment 3 shown in FIG. 9. Table 9 shows the surface data of the zoom lens system of Numerical Example 3. Table 10 shows the aspherical data. Table 11 shows various data in an infinity in-focus condition. Table 12 shows various data in a close-object in-focus condition.

TABLE 9

(Surface data)

| Surface number | r | d | nd | vd |
|---|---|---|---|---|
| Object surface | ∞ | | | |
| 1 | 47.29820 | 1.10000 | 1.83400 | 37.3 |
| 2 | 32.63000 | 4.34250 | 1.48749 | 70.4 |
| 3 | −235.22500 | Variable | | |
| 4 | −139.21920 | 0.70000 | 1.80610 | 33.3 |
| 5 | 16.48640 | 2.21970 | 1.94595 | 18.0 |
| 6 | 51.11510 | 1.13630 | | |
| 7 | −61.74510 | 0.70000 | 1.72825 | 28.3 |
| 8 | 78.44390 | Variable | | |
| 9 | 20.69960 | 3.09890 | 1.80998 | 40.9 |
| 10* | −113.59130 | 0.71500 | | |
| 11 | 13.88000 | 3.48550 | 1.72916 | 54.7 |
| 12 | −114.76390 | 1.34940 | 2.00100 | 29.1 |
| 13 | 11.23590 | 3.85690 | | |
| 14(Diaphragm) | ∞ | 1.50000 | | |
| 15 | 22.37820 | 3.34900 | 1.51760 | 63.5 |
| 16* | −90.31060 | Variable | | |
| 17 | 40.39320 | 0.60000 | 1.77250 | 49.6 |
| 18 | 17.06380 | Variable | | |
| 19 | −21.41700 | 0.70000 | 1.48749 | 70.4 |
| 20 | −46.68440 | Variable | | |
| 21 | −66.82390 | 2.23640 | 1.84666 | 23.8 |
| 22 | −27.31950 | 19.08470 | | |
| 23 | ∞ | (BF) | | |
| Image surface | ∞ | | | |

TABLE 10

(Aspherical data)

Surface No. 10

K = 0.00000E+00, A4 = 1.25211E−05, A6 = −8.48582E−09, A8 = −1.05629E−10 A10 = 4.12001E−13

Surface No. 16

K = 0.00000E+00, A4 = 1.28377E−05, A6 = −2.64327E−07, A8 = 9.90524E−09 A10 = −1.19349E−10

TABLE 11

(Various data in an infinity in-focus condition)

Zooming ratio 3.17180

| | Wide-angle limit | Middle position | Telephoto limit |
|---|---|---|---|
| Focal length | 45.4005 | 80.8562 | 144.0012 |
| F-number | 4.16037 | 5.15805 | 5.75168 |
| View angle | 13.4268 | 7.5308 | 4.2732 |
| Image height | 10.8150 | 10.8150 | 10.8150 |
| Overall length of lens system | 90.6288 | 107.7348 | 128.7232 |
| BF | 0.00000 | 0.00000 | 0.00000 |
| d3 | 4.4176 | 21.5229 | 42.5108 |
| d8 | 17.4988 | 8.1418 | 0.6596 |
| d16 | 1.5617 | 3.6506 | 2.0432 |
| d18 | 16.5255 | 16.7265 | 21.1207 |
| d20 | 0.4500 | 7.5169 | 12.2123 |

TABLE 11-continued (Various data in an infinity in-focus condition)

Zoom lens unit data

| Lens unit | Initial surface No. | Focal length |
|---|---|---|
| 1 | 1 | 109.49142 |
| 2 | 4 | −26.79403 |
| 3 | 9 | 21.52572 |
| 4 | 17 | −38.67918 |
| 5 | 19 | −81.91541 |
| 6 | 21 | 53.20100 |

TABLE 12

(Various data in a close-object in-focus condition)

| | Wide-angle limit | Middle position | Telephoto limit |
|---|---|---|---|
| Object distance | 1000.0000 | 1000.0000 | 1000.0000 |
| BF | 0.00000 | 0.00000 | 0.00000 |
| d3 | 4.4176 | 21.5229 | 42.5108 |
| d8 | 17.4988 | 8.1418 | 0.6596 |
| d16 | 2.4009 | 5.7458 | 7.2522 |
| d18 | 15.6863 | 14.6313 | 15.9117 |
| d20 | 0.4500 | 7.5169 | 12.2123 |

NUMERICAL EXAMPLE 4

The zoom lens system of Numerical Example 4 corresponds to Embodiment 4 shown in FIG. 13. Table 13 shows the surface data of the zoom lens system of Numerical Example 4. Table 14 shows the aspherical data. Table 15 shows various data in an infinity in-focus condition. Table 16 shows various data in a close-object in-focus condition.

TABLE 13

(Surface data)

| Surface number | r | d | nd | vd |
|---|---|---|---|---|
| Object surface | ∞ | | | |
| 1 | 56.73200 | 1.10000 | 1.80610 | 33.3 |
| 2 | 35.09220 | 4.02300 | 1.56384 | 60.8 |
| 3 | −333.49230 | Variable | | |
| 4 | −158.76200 | 0.70000 | 1.80610 | 33.3 |
| 5 | 16.16970 | 2.20530 | 1.94595 | 18.0 |
| 6 | 49.73770 | 1.14740 | | |
| 7 | −58.50990 | 0.70000 | 1.72825 | 28.3 |
| 8 | 77.02650 | Variable | | |
| 9 | 20.77920 | 3.05470 | 1.80998 | 40.9 |
| 10* | −114.87530 | 0.63360 | | |
| 11 | 13.94420 | 3.50500 | 1.72916 | 54.7 |
| 12 | −116.73510 | 1.45050 | 2.00100 | 29.1 |
| 13 | 11.27040 | 3.64960 | | |
| 14(Diaphragm) | ∞ | 2.22460 | | |
| 15 | 22.37520 | 2.39170 | 1.51760 | 63.5 |
| 16* | −83.74270 | Variable | | |
| 17 | 39.06390 | 0.60000 | 1.77250 | 49.6 |
| 18 | 17.21830 | Variable | | |
| 19 | −21.54510 | 0.70000 | 1.48749 | 70.4 |
| 20 | −46.10350 | Variable | | |
| 21 | −65.37600 | 2.18960 | 1.84666 | 23.8 |
| 22 | −27.55870 | 18.93110 | | |
| 23 | ∞ | (BF) | | |
| Image surface | ∞ | | | |

TABLE 14

(Aspherical data)

Surface No. 10

K = 0.00000E+00, A4 = 1.25359E−05, A6 = −8.52468E−09,
A8 = −9.66856E−11 A10 = 2.43778E−13

Surface No. 16

K = 0.00000E+00, A4 = 1.30246E−05, A6 = −2.51365E−07,
A8 = 9.13729E−09 A10 = −1.07104E−10

TABLE 15

(Various data in an infinity in-focus condition)

Zooming ratio 3.17179

|  | Wide-angle limit | Middle position | Telephoto limit |
|---|---|---|---|
| Focal length | 45.4004 | 80.8563 | 144.0003 |
| F-number | 4.16038 | 5.24260 | 5.75634 |
| View angle | 13.4388 | 7.5382 | 4.2739 |
| Image height | 10.8150 | 10.8150 | 10.8150 |
| Overall length of lens system | 91.9007 | 107.1967 | 129.9016 |
| BF | 0.00000 | 0.00000 | 0.00000 |
| d3 | 6.1809 | 21.4764 | 44.1811 |
| d8 | 17.4060 | 7.6009 | 0.6869 |
| d16 | 1.5348 | 4.3295 | 2.3574 |
| d18 | 17.1221 | 16.7857 | 20.4688 |
| d20 | 0.4500 | 7.7966 | 12.9996 |

Zoom lens unit data

| Lens unit | Initial surface No. | Focal length |
|---|---|---|
| 1 | 1 | 110.99793 |
| 2 | 4 | −26.49721 |
| 3 | 9 | 21.58657 |
| 4 | 17 | −40.33975 |
| 5 | 19 | −83.75158 |
| 6 | 21 | 54.81473 |

TABLE 16

(Various data in a close-object in-focus condition)

|  | Wide-angle limit | Middle position | Telephoto limit |
|---|---|---|---|
| Object distance | 1000.0000 | 1000.0000 | 1000.0000 |
| BF | 0.00000 | 0.00000 | 0.00000 |
| d3 | 6.1809 | 21.4764 | 44.1811 |
| d8 | 17.4060 | 7.6009 | 0.6869 |
| d16 | 2.4002 | 6.5154 | 7.8103 |
| d18 | 16.2567 | 14.5998 | 15.0159 |
| d20 | 0.4500 | 7.7966 | 12.9996 |

NUMERICAL EXAMPLE 5

The zoom lens system of Numerical Example 5 corresponds to Embodiment 5 shown in FIG. 17. Table 17 shows the surface data of the zoom lens system of Numerical Example 5. Table 18 shows the aspherical data. Table 19 shows various data in an infinity in-focus condition. Table 20 shows various data in a close-object in-focus condition.

TABLE 17

(Surface data)

| Surface number | r | d | nd | vd |
|---|---|---|---|---|
| Object surface | ∞ |  |  |  |
| 1 | 51.18490 | 1.10000 | 1.80610 | 33.3 |
| 2 | 33.76080 | 4.21910 | 1.51680 | 64.2 |
| 3 | −270.05440 | Variable |  |  |
| 4 | −154.88180 | 0.70000 | 1.80610 | 33.3 |
| 5 | 16.16190 | 2.23140 | 1.94595 | 18.0 |
| 6 | 51.52850 | 1.14240 |  |  |
| 7 | −56.40330 | 0.70000 | 1.72825 | 28.3 |
| 8 | 76.06550 | Variable |  |  |
| 9 | 20.76630 | 3.03160 | 1.80998 | 40.9 |
| 10* | −112.81430 | 0.30980 |  |  |
| 11 | 13.92460 | 3.51970 | 1.72916 | 54.7 |
| 12 | −143.30720 | 1.46530 | 2.00100 | 29.1 |
| 13 | 11.19920 | 3.66920 |  |  |
| 14(Diaphragm) | ∞ | 2.58850 |  |  |
| 15 | 22.23500 | 1.95270 | 1.51760 | 63.5 |
| 16* | −81.19350 | Variable |  |  |
| 17 | 40.27850 | 0.60000 | 1.77250 | 49.6 |
| 18 | 17.34960 | Variable |  |  |
| 19 | −22.96620 | 0.70000 | 1.48749 | 70.4 |
| 20 | −49.54640 | Variable |  |  |
| 21 | −64.50200 | 2.13580 | 1.84666 | 23.8 |
| 22 | −27.96230 | 18.39810 |  |  |
| 23 | ∞ | (BF) |  |  |
| Image surface | ∞ |  |  |  |

TABLE 18

(Aspherical data)

Surface No. 10

K = 0.00000E+00, A4 = 1.26607E−05, A6 = −1.30986E−09,
A8 = −2.91153E−10 A10 = 1.79380E−12

Surface No. 16

K = 0.00000E+00, A4 = 1.30836E−05, A6 = −2.06152E−07,
A8 = 6.98980E−09 A10 = −7.37104E−11

TABLE 19

(Various data in an infinity in-focus condition)

Zooming ratio 3.17183

|  | Wide-angle limit | Middle position | Telephoto limit |
|---|---|---|---|
| Focal length | 45.3992 | 80.8542 | 143.9986 |
| F-number | 4.16016 | 5.26281 | 5.72717 |
| View angle | 13.4596 | 7.5471 | 4.2736 |
| Image height | 10.8150 | 10.8150 | 10.8150 |
| Overall length of lens system | 91.8986 | 106.4279 | 129.5169 |
| BF | 0.00000 | 0.00000 | 0.00000 |
| d3 | 6.1405 | 20.6704 | 43.7596 |
| d8 | 17.4135 | 7.4566 | 0.7128 |
| d16 | 1.5296 | 4.2281 | 1.8038 |
| d18 | 17.9029 | 17.6768 | 22.1180 |
| d20 | 0.4500 | 7.9342 | 12.6612 |

Zoom lens unit data

| Lens unit | Initial surface No. | Focal length |
|---|---|---|
| 1 | 1 | 109.66724 |
| 2 | 4 | −26.46366 |

TABLE 19-continued (Various data in an infinity in-focus condition)

| | | |
|---|---|---|
| 3 | 9 | 21.52356 |
| 4 | 17 | -39.90822 |
| 5 | 19 | -88.58134 |
| 6 | 21 | 56.77861 |

TABLE 20

(Various data in a close-object in-focus condition)

| | Wide-angle limit | Middle position | Telephoto limit |
|---|---|---|---|
| Object distance | 1000.0000 | 1000.0000 | 1000.0000 |
| BF | -0.00132 | -0.00156 | -0.00235 |
| d3 | 6.1405 | 20.6704 | 43.7596 |
| d8 | 17.4135 | 7.4566 | 0.7128 |
| d16 | 2.3718 | 6.3314 | 6.9867 |
| d18 | 17.0607 | 15.5734 | 16.9351 |
| d20 | 0.4500 | 7.9342 | 12.6612 |

NUMERICAL EXAMPLE 6

The zoom lens system of Numerical Example 6 corresponds to Embodiment 6 shown in FIG. 21. Table 21 shows the surface data of the zoom lens system of Numerical Example 6. Table 22 shows the aspherical data. Table 23 shows various data in an infinity in-focus condition. Table 24 shows various data in a close-object in-focus condition.

TABLE 21

(Surface data)

| Surface number | r | d | nd | vd |
|---|---|---|---|---|
| Object surface | ∞ | | | |
| 1 | 51.57160 | 1.10000 | 1.80610 | 33.3 |
| 2 | 34.06140 | 4.19360 | 1.51680 | 64.2 |
| 3 | -267.75790 | Variable | | |
| 4 | -137.88210 | 0.70000 | 1.80610 | 33.3 |
| 5 | 16.24850 | 2.24360 | 1.94595 | 18.0 |
| 6 | 54.03380 | 1.12290 | | |
| 7 | -55.98240 | 0.70000 | 1.72825 | 28.3 |
| 8 | 76.07430 | Variable | | |
| 9 | 20.80770 | 3.04120 | 1.80998 | 40.9 |
| 10* | -109.52180 | 0.26840 | | |
| 11 | 13.95920 | 3.52180 | 1.72916 | 54.7 |
| 12 | -161.94730 | 1.45750 | 2.00100 | 29.1 |
| 13 | 11.20650 | 3.67530 | | |
| 14 (Diaphragm) | ∞ | 2.51270 | | |
| 15 | 23.54970 | 1.82350 | 1.55332 | 71.7 |
| 16* | -92.87830 | Variable | | |
| 17 | 41.00170 | 0.60000 | 1.77250 | 49.6 |
| 18 | 17.49890 | Variable | | |
| 19 | -23.29370 | 0.70000 | 1.48749 | 70.4 |
| 20 | -56.81920 | Variable | | |
| 21 | -67.53210 | 2.20420 | 1.84666 | 23.8 |
| 22 | -27.74490 | 18.50500 | | |
| 23 | ∞ | (BF) | | |
| Image surface | ∞ | | | |

TABLE 22

(Aspherical data)

Surface No. 10

K = 0.00000E+00, A4 = 1.30763E-05, A6 = -2.39796E-09,
A8 = -2.74094E-10 A10 = 1.68008E-12

TABLE 22-continued (Aspherical data)

Surface No. 16

K = 0.00000E+00, A4 = 1.04325E-05, A6 = -1.48885E-07,
A8 = 5.14584E-09 A10 = -5.08728E-11

TABLE 23

(Various data in an infinity in-focus condition)

Zooming ratio 3.17182

| | Wide-angle limit | Middle position | Telephoto limit |
|---|---|---|---|
| Focal length | 45.3994 | 80.5639 | 143.9985 |
| F-number | 4.16058 | 5.24377 | 5.72593 |
| View angle | 13.4748 | 7.5784 | 4.2741 |
| Image height | 10.8150 | 10.8150 | 10.8150 |
| Overall length of lens system | 91.8992 | 106.6483 | 129.6969 |
| BF | 0.00000 | 0.00000 | 0.00000 |
| d3 | 6.1496 | 20.8990 | 43.9473 |
| d8 | 17.4167 | 7.5815 | 0.7104 |
| d16 | 1.5503 | 4.0892 | 1.6689 |
| d18 | 17.6337 | 18.1995 | 23.8502 |
| d20 | 0.7798 | 7.5101 | 11.1508 |

Zoom lens unit data

| Lens unit | Initial surface No. | Focal length |
|---|---|---|
| 1 | 1 | 109.99618 |
| 2 | 4 | -26.48886 |
| 3 | 9 | 21.43299 |
| 4 | 17 | -39.96258 |
| 5 | 19 | -81.54081 |
| 6 | 21 | 54.24328 |

TABLE 24

(Various data in a close-object in-focus condition)

| | Wide-angle limit | Middle position | Telephoto limit |
|---|---|---|---|
| Object distance | 1000.0000 | 1000.0000 | 1000.0000 |
| BF | 0.00000 | 0.00000 | 0.00000 |
| d3 | 6.1496 | 20.8990 | 43.9473 |
| d8 | 17.4167 | 7.5815 | 0.7104 |
| d16 | 2.3853 | 6.1592 | 6.7951 |
| d18 | 16.7987 | 16.1295 | 18.7240 |
| d20 | 0.7798 | 7.5101 | 11.1508 |

NUMERICAL EXAMPLE 7

The zoom lens system of Numerical Example 7 corresponds to Embodiment 7 shown in FIG. 25. Table 25 shows the surface data of the zoom lens system of Numerical Example 7. Table 26 shows the aspherical data. Table 27 shows various data in an infinity in-focus condition. Table 28 shows various data in a close-object in-focus condition.

TABLE 25

(Surface data)

| Surface number | r | d | nd | vd |
|---|---|---|---|---|
| Object surface | ∞ | | | |
| 1 | 51.62750 | 1.10000 | 1.80610 | 33.3 |
| 2 | 34.18690 | 4.17580 | 1.51680 | 64.2 |
| 3 | −266.40530 | Variable | | |
| 4 | −126.56230 | 0.70000 | 1.80610 | 33.3 |
| 5 | 16.37020 | 2.26090 | 1.94595 | 18.0 |
| 6 | 56.23970 | 1.12460 | | |
| 7 | −54.91890 | 0.70000 | 1.72825 | 28.3 |
| 8 | 76.69200 | Variable | | |
| 9 | 20.82520 | 3.05730 | 1.80998 | 40.9 |
| 10* | −106.06360 | 0.25700 | | |
| 11 | 13.96850 | 3.53470 | 1.72916 | 54.7 |
| 12 | −202.80480 | 1.46220 | 2.00100 | 29.1 |
| 13 | 11.17950 | 3.67990 | | |
| 14 (Diaphragm) | ∞ | 2.15030 | | |
| 15 | 22.31950 | 1.95020 | 1.49710 | 81.6 |
| 16* | −70.73090 | Variable | | |
| 17 | 42.95090 | 0.60000 | 1.77250 | 49.6 |
| 18 | 17.76720 | Variable | | |
| 19 | −22.23710 | 0.70000 | 1.48749 | 70.4 |
| 20 | −57.65310 | Variable | | |
| 21 | −70.49510 | 2.28550 | 1.84666 | 23.8 |
| 22 | −27.35420 | 18.47020 | | |
| 23 | ∞ | (BF) | | |
| Image surface | ∞ | | | |

TABLE 26

(Aspherical data)

Surface No. 10

K = 0.00000E+00, A4 = 1.35452E−05, A6 = 5.22629E−09,
A8 = −4.02360E−10 A10 = 2.42184E−12

Surface No. 16

K = 0.00000E+00, A4 = 1.45765E−05, A6 = −2.71335E−07,
A8 = 1.00628E−08 A10 = −1.15748E−10

TABLE 27

(Various data in an infinity in-focus condition)

Zooming ratio 3.17181

| | Wide-angle limit | Middle position | Telephoto limit |
|---|---|---|---|
| Focal length | 45.3999 | 80.8499 | 143.9999 |
| F-number | 4.15203 | 5.22315 | 5.76501 |
| View angle | 13.4858 | 7.5561 | 4.2749 |
| Image height | 10.8150 | 10.8150 | 10.8150 |
| Overall length of lens system | 91.6595 | 106.8573 | 129.2532 |
| BF | 0.00040 | 0.00068 | 0.00116 |
| d3 | 6.1971 | 21.3946 | 43.7901 |
| d8 | 17.3907 | 7.6502 | 0.7044 |
| d16 | 1.5112 | 3.8338 | 1.5118 |
| d18 | 17.1882 | 18.6043 | 25.0617 |
| d20 | 1.1633 | 7.1651 | 9.9754 |

TABLE 27-continued (Various data in an infinity in-focus condition)

Zoom lens unit data

| Lens unit | Initial surface No. | Focal length |
|---|---|---|
| 1 | 1 | 109.71267 |
| 2 | 4 | −26.41264 |
| 3 | 9 | 21.21710 |
| 4 | 17 | −39.63750 |
| 5 | 19 | −74.74090 |
| 6 | 21 | 51.54188 |

TABLE 28

(Various data in a close-object in-focus condition)

| | Wide-angle limit | Middle position | Telephoto limit |
|---|---|---|---|
| Object distance | 1000.0000 | 1000.0000 | 1000.0000 |
| d3 | 6.1971 | 21.3946 | 43.7901 |
| d8 | 17.3907 | 7.6502 | 0.7044 |
| d16 | 2.3347 | 5.8809 | 6.5544 |
| d18 | 16.3647 | 16.5571 | 20.0191 |
| d20 | 1.1633 | 7.1651 | 9.9754 |

NUMERICAL EXAMPLE 8

The zoom lens system of Numerical Example 8 corresponds to Embodiment 8 shown in FIG. 29. Table 29 shows the surface data of the zoom lens system of Numerical Example 8. Table 30 shows the aspherical data. Table 31 shows various data in an infinity in-focus condition. Table 32 shows various data in a close-object in-focus condition.

TABLE 29

(Surface data)

| Surface number | r | d | nd | vd |
|---|---|---|---|---|
| Object surface | ∞ | | | |
| 1 | 49.21510 | 1.10000 | 1.80610 | 33.3 |
| 2 | 33.08740 | 4.21880 | 1.51680 | 64.2 |
| 3 | −274.11240 | Variable | | |
| 4 | −157.09250 | 0.70000 | 1.80610 | 33.3 |
| 5 | 16.16980 | 2.34740 | 1.94595 | 18.0 |
| 6 | 54.93490 | 1.23460 | | |
| 7 | −48.44770 | 0.70000 | 1.72825 | 28.3 |
| 8 | 84.76880 | Variable | | |
| 9 | 21.24110 | 3.19340 | 1.80998 | 40.9 |
| 10* | −79.75860 | 0.20000 | | |
| 11 | 14.21080 | 3.53220 | 1.72916 | 54.7 |
| 12 | −144.63710 | 1.44610 | 2.00100 | 29.1 |
| 13 | 11.11760 | 3.71270 | | |
| 14 (Diaphragm) | ∞ | 5.12840 | | |
| 15 | 17.66320 | 2.65900 | 1.51760 | 63.5 |
| 16* | −71.03440 | Variable | | |
| 17 | 111.56620 | 0.60000 | 1.83400 | 37.3 |
| 18 | 16.92110 | Variable | | |
| 19 | −40.63800 | 0.70000 | 1.48749 | 70.4 |
| 20 | −386.78760 | 4.69490 | | |
| 21 | −127.17770 | 2.50190 | 1.84666 | 23.8 |
| 22 | −29.56910 | 22.19760 | | |
| 23 | ∞ | (BF) | | |
| Image surface | ∞ | | | |

TABLE 30

(Aspherical data)

Surface No. 10

K = 0.00000E+00, A4 = 1.24624E−05, A6 = 5.52659E−08,
A8 = −1.39080E−09 A10 = 9.50405E−12

Surface No. 16

K = 0.00000E+00, A4 = 2.68519E−05, A6 = −7.20468E−07,
A8 = 2.71295E−08 A10 = −3.61670E−10

TABLE 31

(Various data in an infinity in-focus condition)

Zooming ratio 3.17182

| | Wide-angle limit | Middle position | Telephoto limit |
|---|---|---|---|
| Focal length | 45.3992 | 80.8535 | 143.9979 |
| F-number | 4.16067 | 5.27904 | 5.56778 |
| View angle | 13.3764 | 7.4980 | 4.2336 |
| Image height | 10.8150 | 10.8150 | 10.8150 |
| Overall length of lens system | 91.6608 | 104.8752 | 129.8094 |
| BF | 0.00000 | 0.00000 | 0.00000 |
| d3 | 3.3070 | 16.5223 | 41.4567 |
| d8 | 17.4202 | 6.6384 | 0.6691 |
| d16 | 2.1961 | 4.1723 | 1.6376 |
| d18 | 7.8723 | 16.6776 | 25.1815 |

Zoom lens unit data

| Lens unit | Initial surface No. | Focal length |
|---|---|---|
| 1 | 1 | 104.72486 |
| 2 | 4 | −26.51584 |
| 3 | 9 | 21.42948 |
| 4 | 17 | −23.98559 |
| 5 | 19 | 75.94449 |

TABLE 32

(Various data in a close-object in-focus condition)

| | Wide-angle limit | Middle position | Telephoto limit |
|---|---|---|---|
| Object distance | 1000.0000 | 1000.0000 | 1000.0000 |
| BF | 0.00000 | 0.00000 | 0.00000 |
| d3 | 3.3070 | 16.5223 | 41.4567 |
| d8 | 17.4202 | 6.6384 | 0.6691 |
| d16 | 2.7327 | 5.4422 | 4.7627 |
| d18 | 7.3357 | 15.4077 | 22.0564 |

The following Table 33 shows the corresponding values to the individual conditions in the zoom lens systems of each of Numerical Examples.

TABLE 33

(Values corresponding to conditions)

| Condition | Numerical Example | | | | | | | |
|---|---|---|---|---|---|---|---|---|
| | 1 | 2 | 3 | 4 | 5 | 6 | 7 | 8 |
| (1) $nd_2$ | 1.5618 | 1.5618 | 1.4875 | 1.5638 | 1.5618 | 1.5618 | 1.5618 | 1.5618 |
| (2) $vd_2$ | 64.2 | 64.2 | 70.4 | 60.8 | 64.2 | 64.2 | 64.2 | 64.2 |
| (3) $vd_1$ | 33.3 | 33.3 | 37.3 | 33.3 | 33.3 | 33.3 | 33.3 | 33.3 |
| (4) sp | 0.810 | 0.782 | 0.756 | 0.810 | 0.778 | 0.774 | 0.773 | 0.785 |
| (5) $f_T/f_R$ | 1.35 | 1.89 | 1.45 | 1.41 | 1.36 | 1.34 | 1.34 | 1.90 |
| (6) $f_1/f_T$ | 0.76 | 0.73 | 0.76 | 0.77 | 0.76 | 0.76 | 0.76 | 0.73 |
| (7) $f_{3a}/f_{3b}$ | 0.88 | 1.07 | 0.86 | 0.87 | 0.88 | 0.87 | 0.86 | 1.06 |
| (8) $f_{3b}/\sqrt{(f_W/f_T)}$ | 0.42 | 0.34 | 0.43 | 0.43 | 0.42 | 0.42 | 0.43 | 0.34 |
| (9) $D_O/D_3$ | 0.88 | 0.86 | 0.81 | 0.86 | 0.88 | 0.89 | 0.88 | 0.87 |
| (10) $vd_O$ | 63.5 | 63.5 | 63.5 | 63.5 | 63.5 | 71.7 | 81.6 | 63.5 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system having a plurality of lens units, each lens unit comprising at least one lens element,
the zoom lens system, in order from an object side to an image side, comprising: a first lens unit having positive optical power; a second lens unit having negative optical power; a third lens unit having positive optical power; a fourth lens unit having negative optical power, and a subsequent lens unit having optical power, wherein:
the first lens unit consists of one negative lens element, and one positive lens element,
the second lens unit consists of three lens elements, at least two lens elements among the three lens elements being cemented with each other, and
the following conditions (1) and (2) are satisfied:

$$1.47 < nd_2 < 1.57 \quad (1)$$

$$60 < vd_2 < 75 \quad (2)$$

where
$nd_2$ is a refractive index to a d-line of the positive lens element, and
$vd_2$ is an Abbe number to a d-line of the positive lens element, and
the following condition (3) is satisfied:

$$28 < vd_1 < 40 \quad (3)$$

where
$vd_1$ is an Abbe number to a d-line of the negative lens element.

2. The zoom lens system as claimed in claim 1, wherein the following condition (4) is satisfied:

$$0.60 < sp < 0.95 \quad (4)$$

where $$sp = (R_{2R} + R_{2F})/(R_{2R} - R_{2F}),$$

$R_{2F}$ is a radius of curvature of an object side surface of the positive lens element, and
$R_{2R}$ is a radius of curvature of an image side surface of the positive lens element.

3. The zoom lens system as claimed in claim 1, wherein the positive lens element and the negative lens element are cemented with each other.

4. The zoom lens system as claimed in claim 1, wherein the first lens unit, in order from the object side to the image side, consists of the negative lens element, and the positive lens element.

5. The zoom lens system as claimed in claim 1, wherein the following condition (5) is satisfied:

$$0.5 < f_T/f_R < 3.0 \quad (5)$$

where
$f_T$ is a focal length of the zoom lens system at a telephoto limit, and
$f_R$ is a composite focal length of the subsequent lens unit at a telephoto limit.

6. The zoom lens system as claimed in claim 1, wherein the following condition (6) is satisfied:

$$0.6 < f_1/f_T < 0.9 \quad (6)$$

where
$f_1$ is a focal length of the first lens unit, and
$f_T$ is a focal length of the zoom lens system at a telephoto limit.

7. The zoom lens system as claimed in claim 1, wherein the subsequent lens unit, in order from the object side to the image side, comprises: a fifth lens unit having negative optical power, and a sixth lens unit having positive optical power.

8. The zoom lens system as claimed in claim 1, wherein the fourth lens unit is a focusing lens unit that moves along an optical axis, in focusing from an infinity in-focus condition to a close-object in-focus condition.

9. The zoom lens system as claimed in claim 1, wherein the second lens unit is fixed with respect to an image surface, in zooming from a wide-angle limit to a telephoto limit at a time of image taking.

10. The zoom lens system as claimed in claim 1, wherein the third lens unit, in order from the object side to the image side, comprises: a third-a sub lens unit having positive optical power; and a third-b sub lens unit having positive optical power,
the third-b sub lens unit is an image blur compensating lens unit that moves in a direction perpendicular to an optical axis in order to optically compensate image blur, and
the following conditions (7) and (8) are satisfied:

$$0.8 < f_{3a}/f_{3b} < 1.4 \quad (7)$$

$$0.1 < f_{3b}/\sqrt{(f_W/f_T)} < 0.6 \quad (8)$$

where
$f_{3a}$ is a focal length of the third-a sub lens unit,
$f_{3b}$ is a focal length of the third-b sub lens unit,
$f_W$ is a focal length of the zoom lens system at a wide-angle limit, and
$f_T$ is a focal length of the zoom lens system at a telephoto limit.

11. The zoom lens system as claimed in claim 10, wherein an aperture diaphragm is provided between the third-a sub lens unit and the third-b sub lens unit.

12. The zoom lens system as claimed in claim 10, wherein the following condition (9) is satisfied:

$$0.7 < D_O/D_3 < 0.95 \quad (9)$$

where
$D_O$ is an optical axial distance from a most object side lens surface in the third-a sub lens unit to a most object side lens surface in the third-b sub lens unit, and
$D_3$ is an optical axial distance from a most object side lens surface in the third lens unit to a most image side lens surface in the third lens unit.

13. The zoom lens system as claimed in claim 10, wherein the third-b sub lens unit is composed of one lens element having an aspheric surface.

14. The zoom lens system as claimed in claim 13, wherein the following condition (10) is satisfied:

$$60 < vd_O < 85 \quad (10)$$

where
$vd_O$ is an Abbe number to a d-line of the lens element having an aspheric surface.

15. An interchangeable lens apparatus comprising:
a zoom lens system as claimed in claim 1; and
a lens mount section which is connectable to a camera body including an image sensor for receiving an optical image formed by the zoom lens system and converting the optical image into an electric image signal.

16. A camera system comprising:
an interchangeable lens apparatus including a zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

* * * * *